US009505954B2

(12) United States Patent
Bergkvist

(10) Patent No.: US 9,505,954 B2
(45) Date of Patent: Nov. 29, 2016

(54) SOLVENT-LESS ADHESIVE BONDING

(71) Applicant: The Research Foundation for the State University of New York, Albany, NY (US)

(72) Inventor: Magnus Bergkvist, Albany, NY (US)

(73) Assignee: The Research Foundation for The State University of New York, Albany, NY (US)

( * ) Notice: Subject to any disclaimer, the term of this patent is extended or adjusted under 35 U.S.C. 154(b) by 465 days.

(21) Appl. No.: 14/077,957

(22) Filed: Nov. 12, 2013

(65) Prior Publication Data

US 2014/0134439 A1    May 15, 2014

Related U.S. Application Data

(60) Provisional application No. 61/725,736, filed on Nov. 13, 2012.

(51) Int. Cl.
| | |
|---|---|
| *C09J 7/02* | (2006.01) |
| *C09J 5/00* | (2006.01) |
| *B32B 27/08* | (2006.01) |
| *B32B 37/12* | (2006.01) |
| *B32B 37/24* | (2006.01) |

(52) U.S. Cl.
CPC .............. *C09J 5/00* (2013.01); *B32B 27/08* (2013.01); *B32B 37/12* (2013.01); *B32B 2037/246* (2013.01); *B32B 2309/02* (2013.01); *B32B 2309/04* (2013.01); *B32B 2309/12* (2013.01); *B32B 2310/0831* (2013.01); *B32B 2457/14* (2013.01); *C09J 2400/226* (2013.01); *Y10T 428/30* (2015.01); *Y10T 428/31507* (2015.04); *Y10T 428/31533* (2015.04); *Y10T 428/31667* (2015.04); *Y10T 428/31692* (2015.04); *Y10T 428/31721* (2015.04); *Y10T 428/31797* (2015.04); *Y10T 428/31913* (2015.04)

(58) Field of Classification Search
CPC ........... B32B 27/08; B32B 37/12; C09J 5/00
See application file for complete search history.

(56) References Cited

U.S. PATENT DOCUMENTS

2006/0228966 A1* 10/2006 Gleason ................ A61L 15/24
442/123

* cited by examiner

*Primary Examiner* — Daniel McNally
(74) *Attorney, Agent, or Firm* — Harris Beach PLLC

(57) ABSTRACT

A method for solvent-less adhesive bonding is provided comprising depositing thin, functional, polymeric films on one or more substrates and bonding the substrates to each other or to other substrates. Depositing the polymeric films, including, for example, chemically reactive polymers and thermoplastics with adhesive qualities, may be accomplished using an initiated chemical vapor deposition technique compatible with a variety of monomers, including monomers with chemically functional moieties such as amine and epoxy groups. The technique allows for deposition of polymeric films on a wide variety of substrates/devices and provides an alternative for other coating/deposition methods that are incompatible with certain substrates/devices and/or do not provide adequate control over the resulting polymeric film. The provided method is advantageous in that it is applicable to fabrication of hybrid devices and is compatible with microfabrication technology, including that in clean-room settings.

18 Claims, 8 Drawing Sheets

Figure 1:
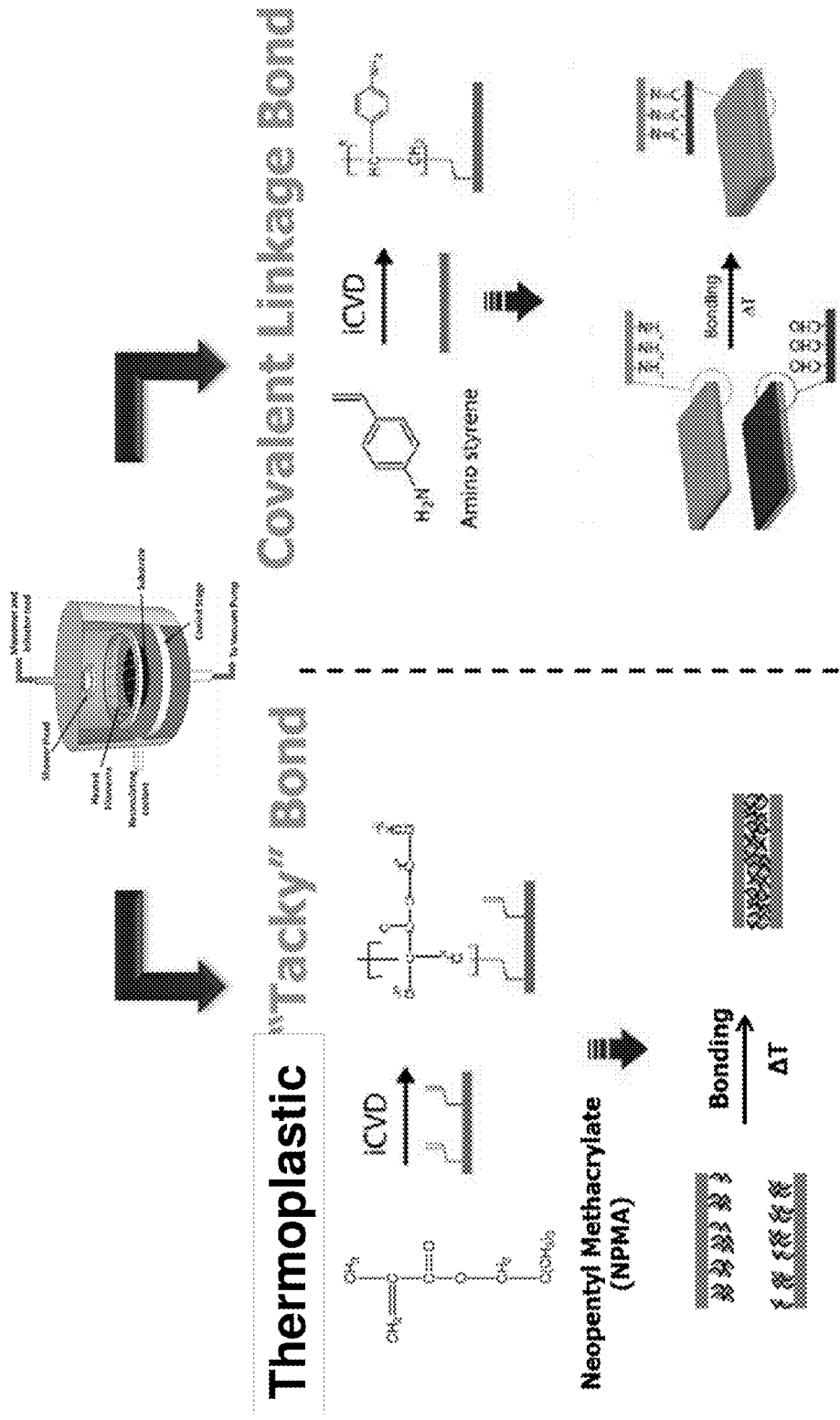

Adhesion energy of pNPMA iCVD films annealed at different temperatures

| Sl. No | Temperature (°C) | Force (N) | Adhesion Energy Gc (mJ/m2) |
|---|---|---|---|
| 1 | 25 | 56 | 400.5 |
| 2 | 100 | 55.9 | 399.81 |
| 3 | 150 | 55.6 | 397.66 |
| 4 | 200 | 56.2 | 401.96 |
| 5 | 350 | 57.6 | 412.3 |

- Adhesive failure observed in all samples
- Adhesive energy between silicon and iCVD pNPMA matches well with reported values

Fig. 3

SOLVENT-LESS ADHESIVE BONDING

CROSS-REFERENCE TO RELATED APPLICATIONS

This application claims priority to and the benefit of co-pending U.S. provisional patent application Ser. No. 61/725,736, entitled Solvent-Less Adhesive Bonding, filed Nov. 13, 2012, which is incorporated herein by reference in its entirety.

1. TECHNICAL FIELD

The present invention relates to methods for solvent-less adhesive bonding (SAB) of substrates. The invention further relates to microfabrication techniques for depositing polymeric films onto substrates.

2. BACKGROUND OF THE INVENTION

Wafer bonding is a microelectromechanical (MEMS), nanoelectromechanical (NEMS), microelectronic, and/or optoelectronic packaging technology for mechanically stable and hermetically sealed device encapsulation. A number of wafer bonding techniques have been developed, including adhesive bonding, anodic bonding, direct bonding, direct metal-to-metal bonding, eutectic bonding, low-temperature melting glass bonding, solder bonding, thermocompression bonding, and ultrasonic bonding. With respect to the foregoing wafer bonding techniques, adhesive wafer bonding is advantageous in that it is a relatively low-temperature technique that does not require application of an electric voltage or current. As such, adhesive wafer bonding may be applied to a wide variety of substrates that are sensitive to temperature and/or the application of electric voltage or current, and is important in integrated circuit (IC) packaging concepts, such as Wafer Level Packaging (WLP), System in Package (SiP), and three-dimensional (3D) integration.

Adhesive wafer bonding is commonly performed by applying an organic adhesive on one or both substrates using a spin-on or spray-on technique. Such a technique requires that the adhesive be dissolved in a solvent, examples being SU-8, SU-8 2000, Polyimide, and BCB, three commonly used adhesives in adhesive wafer bonding, dissolved in gamma butyrolactone, cyclopentanone, and xylene respectively. Application of the foregoing solvent-based, organic adhesives has a significant drawback when it comes to three-dimensional and other non-planar substrates, namely a lack of adequate control resulting in uneven distribution of the adhesive, issues with outgassing of solvents, and delamination and wrinkling upon solvent bake/annealing.

Citation or identification of any reference in Section 2, or in any other section of this application, shall not be considered an admission that such reference is available as prior art to the present invention.

3. SUMMARY OF THE INVENTION

A method for solvent-free bonding of substrates is provided, comprising:
a) depositing a polymeric film on a first surface of a first substrate and optionally depositing a polymeric film on a first surface of a second substrate, wherein depositing the polymeric film(s) comprises using initiated chemical vapor deposition (iCVD);

b) optionally aging each substrate comprising a deposited polymeric film at a temperature above the glass transition temperature of the deposited polymeric film until an amount of included monomers and/or short-chain polymers in the polymeric film is released; and
c) bonding the first substrate to the second substrate by contacting the first surface of the first substrate with the first surface of the second substrate.

In one embodiment of the method, the step of depositing the polymeric film is carried out in a deposition chamber, e.g., an iCVD deposition chamber.

In another embodiment, a method is provided for solvent-free bonding of a first substrate and a second substrate, the method comprising the steps of:
depositing a first polymeric film on a first surface of a first substrate, wherein the step of depositing the first polymeric film comprises using initiated chemical vapor deposition (iCVD), and wherein the step of depositing the first polymeric film is conducted in a deposition chamber; and
bonding the first substrate to the second substrate, wherein the bonding step comprises the step of contacting the first surface of the first substrate with a first surface of the second substrate.

In one embodiment of the method, the method additionally comprises the step of depositing a second polymeric film on a first surface of the second substrate, wherein the step of depositing the second polymeric film comprises using initiated chemical vapor deposition.

In another embodiment of the method, a polymeric film is not deposited on the first surface of the second substrate.

In another embodiment of the method, a polymeric film is deposited on the first surface of the second substrate.

In another embodiment of the method, the method comprises the step of aging the first substrate comprising the deposited first polymeric film at a temperature above the glass transition temperature of the deposited first polymeric film until an amount of included monomers and/or short-chain polymers in the first polymeric film is released.

In another embodiment of the method, the method comprises the step of aging the second substrate comprising the deposited second polymeric film at a temperature above the glass transition temperature of the deposited second polymeric film until an amount of included monomers and/or short-chain polymers in the second polymeric film is released.

In another embodiment of the method, the first surface of each substrate is cleaned to remove surface contamination prior to depositing the polymeric film on the substrate. In a specific embodiment, the first surface of the first substrate and the first surface of the second substrate are cleaned to remove surface contamination prior to depositing the first polymeric film and the second polymeric film. In another embodiment, the first surface of each substrate is cleaned using plasma or a chemical cleaning solution.

In another embodiment of the method, the polymeric film on the first surface of the first substrate and the polymeric film on the first surface of the second substrate are the same (i.e., have the same composition or are made of the same material). In another embodiment, the polymeric film on the first surface of the first substrate and the polymeric film on the first surface of the second substrate are different compositions or materials.

In another embodiment of the method, the first polymeric film is deposited at a substrate temperature of at least 0° C. and no more than 100° C.

In another embodiment of the method, the first and/or second polymeric films are deposited at a substrate temperature of at least 0° C. and no more than 100° C.

In another embodiment of the method, the first and/or second polymeric films are deposited at a substrate temperature of at least 10° C. and no more than 50° C.

In another embodiment of the method, the temperature in the deposition chamber is at least 5° C. higher than substrate temperature.

In another embodiment of the method, the deposition chamber pressure is at least 1 mTorr and no more than 1000 mTorr.

In another embodiment of the method, the deposition chamber pressure is at least 100 mTorr and no more than 800 mTorr.

In another embodiment of the method, the monomer and the initiator for preparing the first polymeric film are introduced to the deposition chamber at a monomer flow rate and an initiator flow rate, respectively, that provides a monomer/initiator molar ratio of at least 1 and no more than 30.

In another embodiment of the method, the monomer and the initiator for preparing the second polymeric film are introduced to the deposition chamber at a monomer flow rate and an initiator flow rate, respectively, that provides a monomer/initiator molar ratio of at least 1 and no more than 30.

In another embodiment of the method, the monomer/initiator molar ratio for preparing a polymeric film ((e.g., the first and/or second polymeric film) is at least 2 and no more than 15.

In another embodiment of the method, the monomer flow rate is held constant.

In another embodiment of the method, the monomer flow rate is varied.

In another embodiment of the method, the initiator flow rate is held constant.

In another embodiment of the method, the initiator flow rate is varied.

In another embodiment of the method, the deposited first polymeric film is at least 5 nm and no more than 15 µm thick.

In another embodiment of the method, the deposited second polymeric film is at least 5 nm and no more than 15 µm thick.

In another embodiment of the method, the deposited first and/or second polymeric film is at least 50 nm and no more than 500 nm thick.

In another embodiment of the method, the deposited first and/or second polymeric film is at least 100 nm and no more than 300 nm thick.

In another embodiment of the method, the temperature above the glass transition temperature of the deposited first polymeric film is at least 10° C. over the glass transition temperature of the deposited first polymeric film.

In another embodiment of the method, the temperature above the glass transition temperature of the deposited second polymeric film is at least 10° C. over the glass transition temperature of the deposited second polymeric film.

In another embodiment of the method, the temperature above the glass transition temperature of the deposited first polymeric film is at least 25° C. over the glass transition temperature of the deposited first polymeric film.

In another embodiment of the method, the temperature above the glass transition temperature of the deposited second polymeric film is at least 25° C. over the glass transition temperature of the deposited second polymeric film.

In another embodiment of the method, the temperature above the glass transition temperature of the deposited first polymeric film is at least 50° C. over the glass transition temperature of the deposited first polymeric film.

In another embodiment of the method, the temperature above the glass transition temperature of the deposited second polymeric film is at least 50° C. over the glass transition temperature of the deposited second polymeric film.

In another embodiment of the method, the temperature above the glass transition temperature of the deposited first and/or second polymeric film is at least 50° C.

In another embodiment of the method, the temperature above the glass transition temperature of the deposited first and/or second polymeric film is at least 100° C.

In another embodiment of the method, the temperature above the glass transition temperature of the deposited first and/or second polymeric film is at least 150° C.

In another embodiment of the method, the first substrate is aged at a temperature above the glass transition temperature of the deposited first polymeric film for at least 5 minutes.

In another embodiment of the method, the second substrate is aged at a temperature above the glass transition temperature of the deposited second polymeric film for at least 5 minutes.

In another embodiment of the method, the first substrate is aged at temperature above the glass transition temperature of the deposited first polymeric film for at least 10 minutes.

In another embodiment of the method, the second substrate is aged at temperature above the glass transition temperature of the deposited second polymeric film for at least 10 minutes.

In another embodiment of the method, the amount of included monomers and/or short-chain polymers in the first polymeric film released is at least 30% by weight of the included monomers and/or short-chain polymers.

In another embodiment of the method, the amount of included monomers and/or short-chain polymers in the second polymeric film released is at least 30% by weight of the included monomers and/or short-chain polymers.

In another embodiment of the method, the amount of included monomers and/or short-chain polymers in the polymeric film released is at least 50% by weight of the included monomers and/or short-chain polymers.

In another embodiment of the method, the significant amount of included monomers and/or short-chain polymers in the polymeric film released is at least 75% by weight of the included monomers and/or short-chain polymers.

In another embodiment of the method, the step of contacting the first surface of the first substrate with the first surface of the second substrate comprises contacting with an applied force of at least 100 N.

In another embodiment of the method, contacting the first surface of the first substrate with the first surface of the second substrate comprises contacting with an applied force of at least 1000 N.

In another embodiment of the method, contacting the first surface of the first substrate with the first surface of the second substrate comprises contacting with an applied force of at least 5000 N.

In another embodiment of the method, contacting the first surface of the first substrate with the first surface of the second substrate further comprises contacting at a temperature of at least 10° C. over the glass transition temperature of at least one of the deposited polymeric films.

In another embodiment of the method, contacting the first surface of the first substrate with the first surface of the second substrate further comprises contacting at a temperature of at least 25° C. over the glass transition temperature of at least one of the deposited polymeric films.

In another embodiment of the method, contacting the first surface of the first substrate with the first surface of the second substrate further comprises contacting at a temperature of at least 50° C. over the glass transition temperature of at least one of the deposited polymeric films.

In another embodiment of the method, contacting the first surface of the first substrate with the first surface of the second substrate further comprises contacting at a temperature of at least 50° C.

In another embodiment of the method, contacting the first surface of the first substrate with the first surface of the second substrate further comprises contacting at a temperature of at least 100° C.

In another embodiment of the method, contacting the first surface of the first substrate with the first surface of the second substrate further comprises contacting at a temperature of at least 150° C.

In another embodiment of the method, contacting the first surface of the first substrate with the first surface of the second substrate further comprises contacting under applied heat and pressure for at least 5 minutes.

In another embodiment of the method, contacting the first surface of the first substrate with the first surface of the second substrate further comprises contacting under applied heat and pressure for at least 10 minutes.

In another embodiment of the method, contacting the first surface of the first substrate with the first surface of the second substrate further comprises cooling the substrates to room temperature under applied pressure.

In another embodiment of the method, the composition of the first substrate and the composition of the second substrate are the same composition.

In another embodiment of the method, the composition of the first substrate and the composition of the second substrate are different compositions.

In another embodiment of the method, the composition of the first substrate, the composition of the second substrate, or the composition of both the first and second substrates is selected from the group consisting of silicon-based materials, polyethylene terephthalate (PET), polyethylene naphthalate (PEN), polycarbonate (PC), polyethersulphone (PES), polycyclic olefin (PCO), polyimide (KAPTON®), polyethyleneimine (PEI), graphene, carbon nanotubes, and metal foils.

In another embodiment, the composition of the first substrate and/or the second substrates is silicon.

In another embodiment of the method, the composition of both the first and second substrates is silicon.

In another embodiment of the method, the deposited first polymeric film is selected from the group consisting of polyacrylates, polydiacrylates, polymethacrylates, polystyrenes, and polyvinyls.

In another embodiment of the method, the deposited second polymeric film is selected from the group consisting of polyacrylates, polydiacrylates, polymethacrylates, polystyrenes, and polyvinyls.

In a specific embodiment of the method, the deposited first and/or second polymeric film is a poly(alkyl methacrylate).

In a specific embodiment of the method, the deposited first and/or second polymeric film is poly(neopentyl methacrylate) (PnPMA).

In a specific embodiment of the method, the deposited first and/or second polymeric film is polyglycidyl methylmethacrylate (pGMA)

A bonded structure is also provided, the bonded structure comprising:
  at least a first substrate and a second substrate, wherein the first substrate and the second substrate are bonded together with a polymeric film, wherein:
    (i) the first substrate and the second substrate comprise a material selected from the group consisting of silicon-based materials, polyethylene terephthalate (PET), polyethylene naphthalate (PEN), polycarbonate (PC), polyethersulphone (PES), polycyclic olefin (PCO), polyimide (KAPTON®), polyethyleneimine (PEI), graphene, carbon nanotubes, and metal foils,
    (ii) the polymeric film is selected from the group consisting of polyacrylates, polydiacrylates, polymethacrylates, polystyrenes, and polyvinyls, and
    (iii) the structure comprises a void area of less than 5%.

In one embodiment of the bonded structure, the bonded structure has enough integrity to withstand chemical mechanical planarization.

In another embodiment of the bonded structure, the bonded structure comprises a void area. In a preferred embodiment, the void area of the bonded structure does not increase after chemical mechanical planarization.

In another embodiment of the bonded structure, the adhesion energy of the polymeric film is at least 175 mJ/m$^2$ at room temperature.

In another embodiment of the bonded structure, the adhesion energy of the polymeric film is at least 350 mJ/m$^2$ at room temperature.

In another embodiment of the bonded structure, the adhesion energy of the polymeric film is at least 175 mJ/m$^2$ at 350° C.

In another embodiment of the bonded structure, the adhesion energy of the polymeric film is at least 350 mJ/m$^2$ at 350° C.

These and other features, aspects, and advantages of the invention may be better understood with reference to the following drawings, description, and appended claims.

4. BRIEF DESCRIPTION OF THE DRAWINGS

The present invention is described herein with reference to the accompanying drawings, in which similar reference characters denote similar elements throughout the several views. It is to be understood that in some instances, various aspects of the invention may be shown exaggerated, enlarged, exploded, or incomplete to facilitate an understanding of the invention.

FIG. 1. Schematic flow diagrams of initiated chemical vapor deposition (iCVD) polymer bonding concepts and exemplary methods of bonding substrates. The structure in the top row depicts an iCVD chamber (also referred to herein as "deposition chamber") with (going clock-wise), monomer and initiator feed, substrate, cooled stage, arrow showing direction to vacuum pump, recirculating coolant, heated filaments and shower head. This chamber is shown enlarged in FIG. 2. Underneath the deposition chamber on the left side is a schematic for a thermoplastic "tacky" bond. Underneath the deposition chamber on the right side is schematic for a covalent linkage bond.

Figure 2:
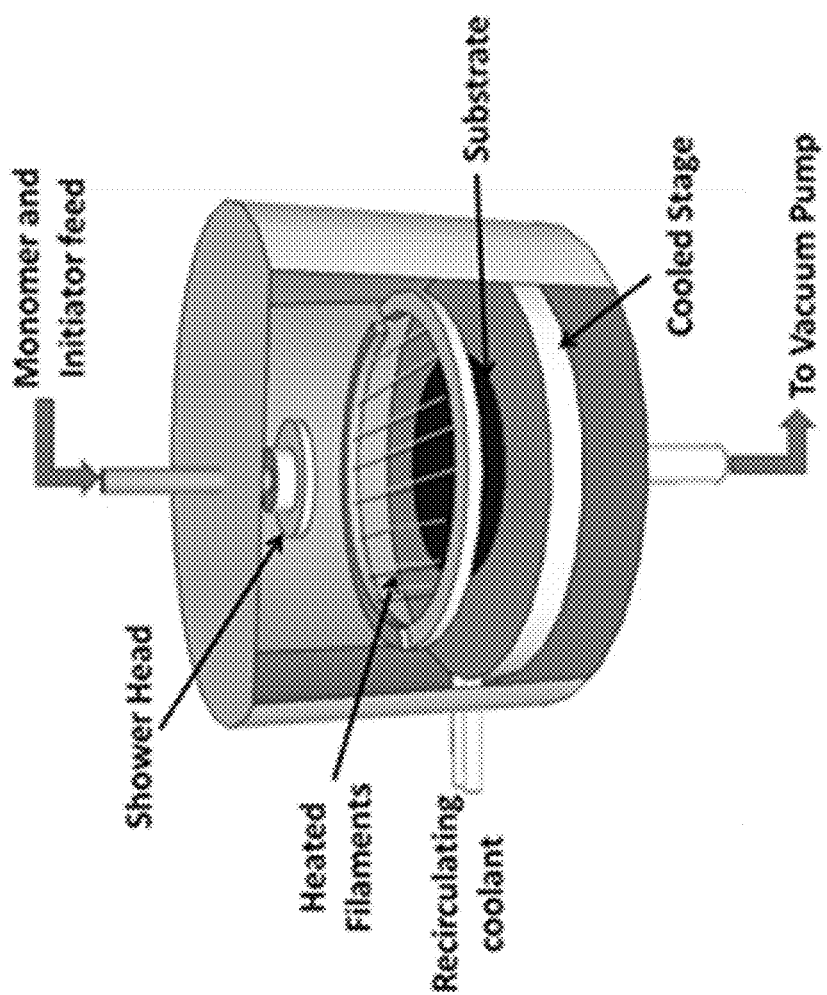

FIG. 2. Schematic diagram of an exemplary deposition chamber used for initiated chemical vapor deposition (iCVD), showing (going clock-wise), monomer and initiator feed, substrate, cooled stage, arrow showing direction to vacuum pump, recirculating coolant, heated filaments and shower head.

FIG. 3. Adhesion energies for deposited poly(neopentyl methacrylate) (pNPMA) iCVD films annealed at different temperatures and applied forces. Adhesive failure was observed in all samples. Adhesive energy between silicon and iCVD pNPMA matches well with reported values. Sample number, S1. No. See Example 1 for details.

Figure 4:
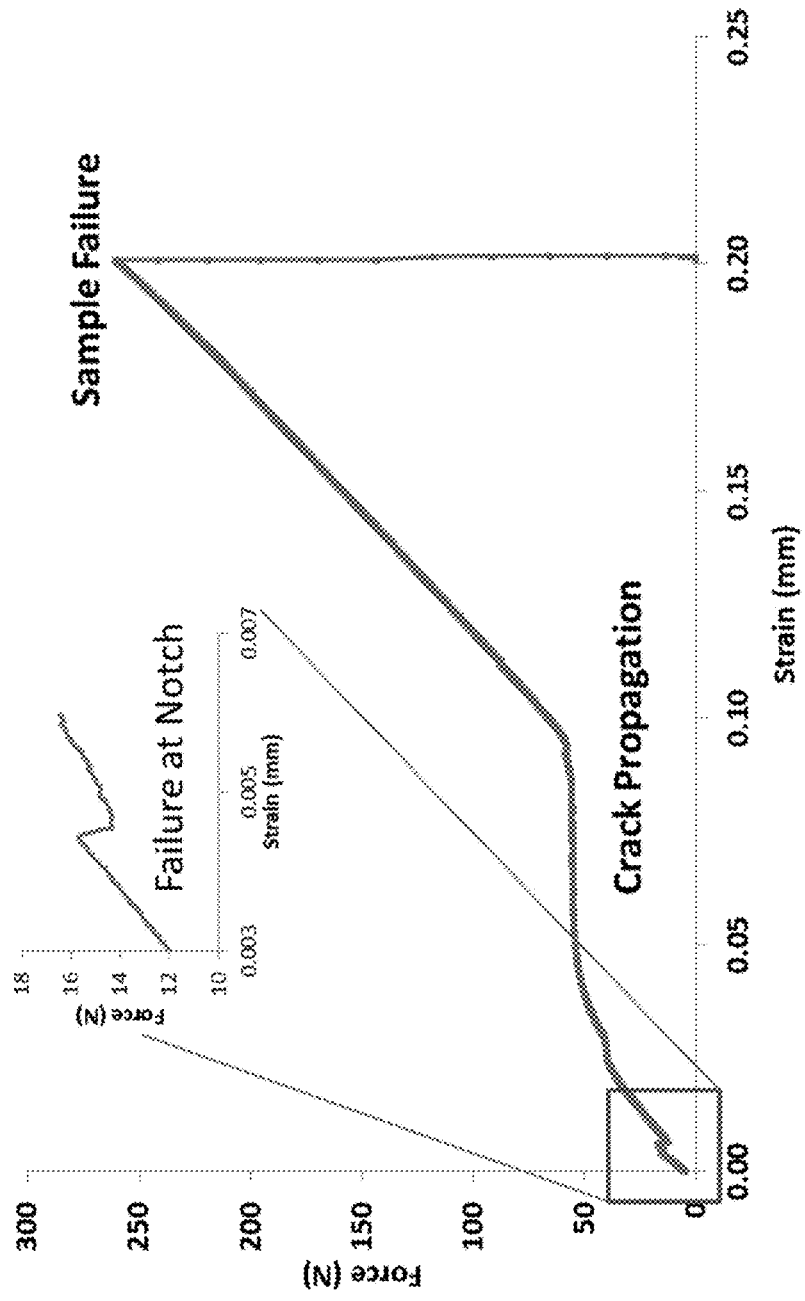

FIG. 4. Plot of four-point bend test for adhesion energy evaluation for 300 mm bonded wafer—diced. The plot shows applied force versus strain for a four-point bend test of two silicon wafers bonded with a deposited poly(neopentyl methacrylate) (PnPMA). See Example 1 for details.

Figure 5A:
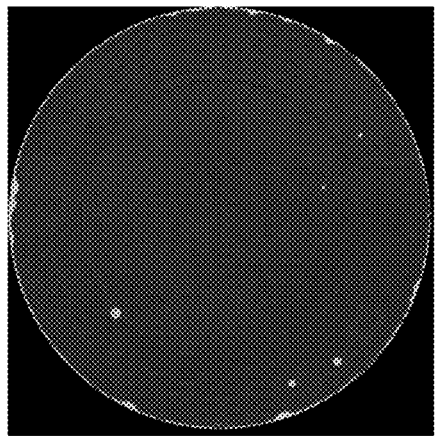
Figure 5B:
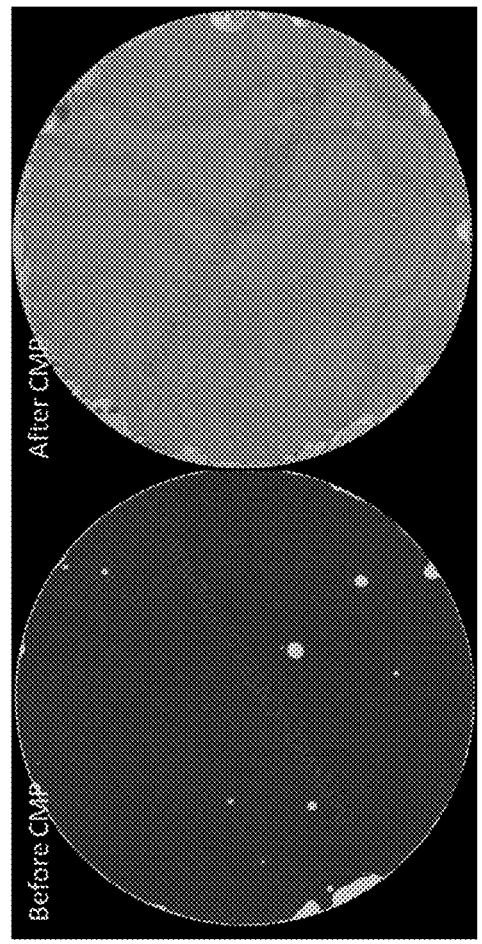

FIGS. 5A and 5B. Scanning acoustic microscopy (SAM) images of wafers bonded with poly(neopentyl methacrylate) (PnPMA) after chemical mechanical planarization (CMP). A. SAM image of 300 mm wafer bonded with PnPMA at 150° C. for 15 min Void area <2.5%. B. SAM image of 300 mm wafer bonded with iCVD PnPMA pre/post chemical-mechanical planarization or polishing (CMP) (back wafer thinned to <90 micron thickness). Image on left is before CMP. Image on right is after CMP. Voided area on wafer <5% with no increase in voids after CMP.

Figure 6:
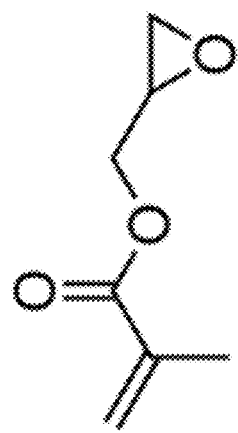

FIG. 6. Polyglycidyl methylmethacrylate (pGMA) monomer. See Example 2 for details.

Figure 7:
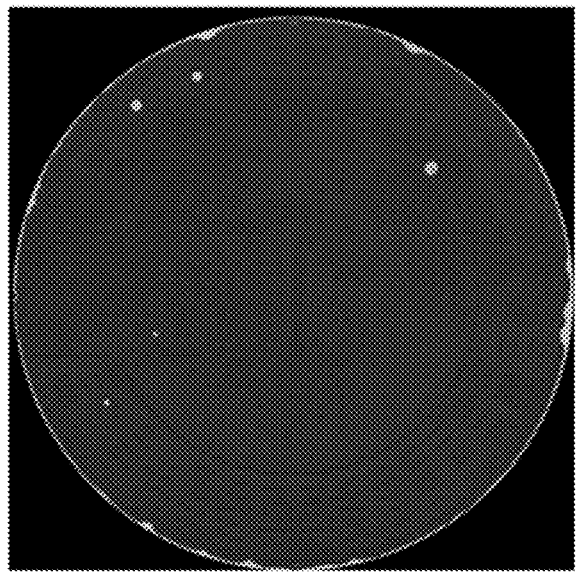

FIG. 7. Scanning acoustic microscopy (SAM) image of bond interface of two 300 mm Si wafers bonded using iCVD PnPMA adhesive film. A few voids can be seen, likely due to manual handling of the wafers. Bonded area: ~98%. See Example 2 for details.

Figure 8:
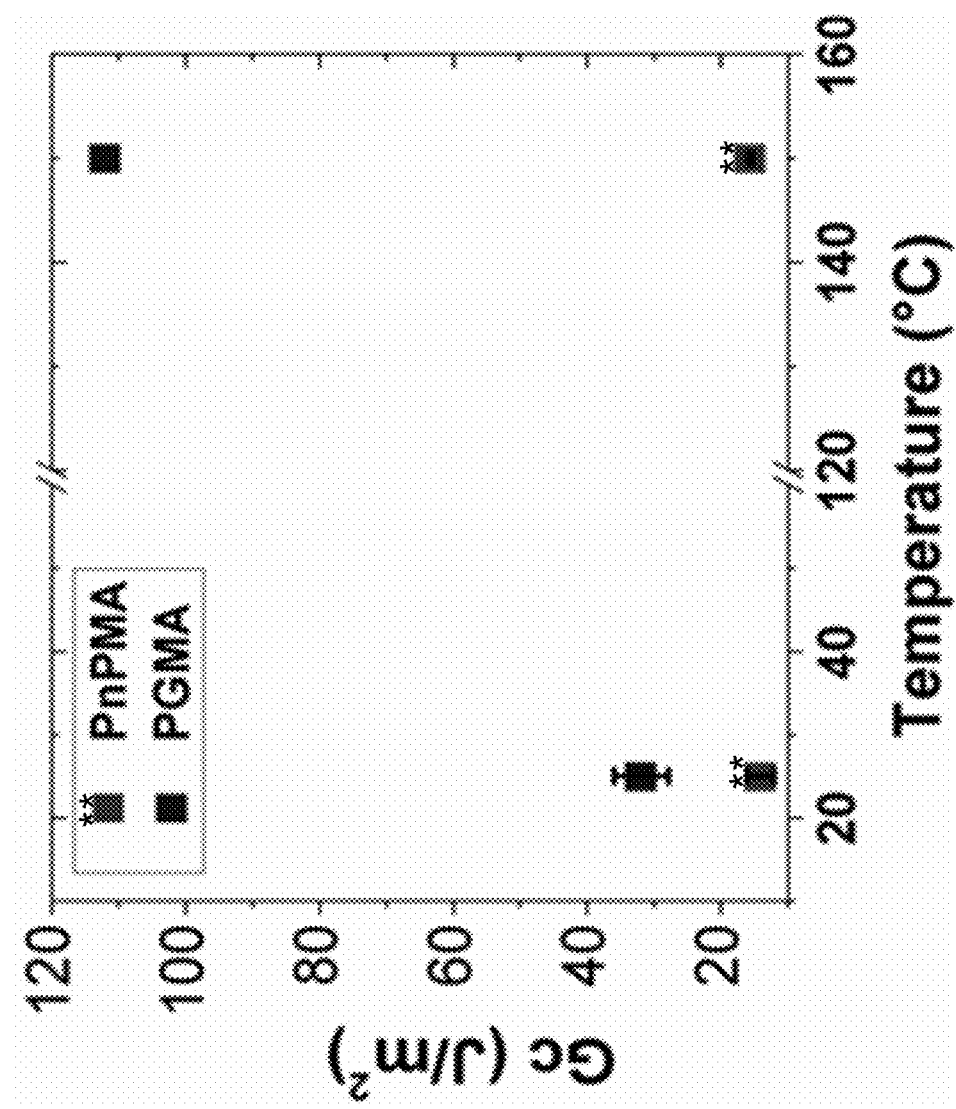

FIG. 8. Critical release energy (Gc) determined by 4-point bend test for iCVD PnPMA (square topped with asterisks **) and PGMA (plain square) with Si wafer annealed at 25 and 150° C., respectively. See Example 2 for details.

Figure 9:
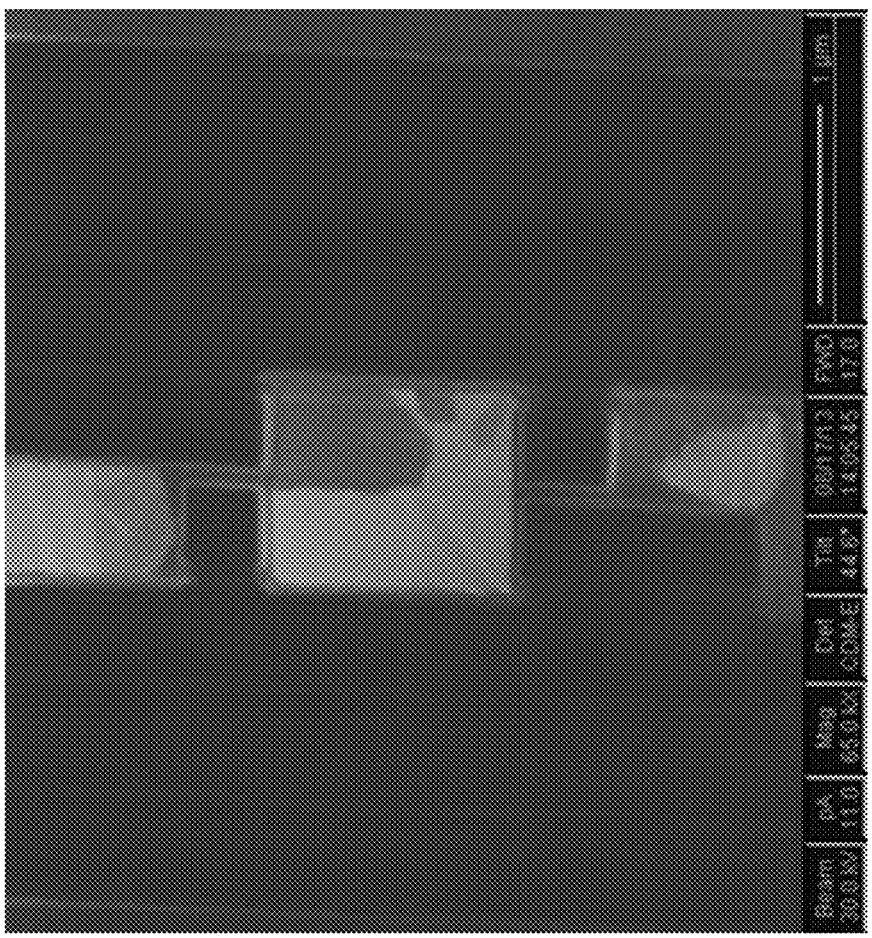

FIG. 9. Scanning electron microscopic (SEM) cross-section of bond interface post Cu—Cu bonding. SAB was used for low temperature bonding to align and place individual dies. This illustrates that the iCVD-SAB polymers allow die alignment/placement without apparent interference with metallic bonding. See Example 2 for details.

5. DETAILED DESCRIPTION OF THE INVENTION

A method for solvent-less adhesive bonding (SAB) is provided comprising depositing thin, functional, polymeric films on one or more substrates and bonding the substrates to each other or to other substrates. Depositing the polymeric films, including, for example, chemically reactive polymers and thermoplastics with adhesive qualities, may be accomplished using an initiated chemical vapor deposition (iCVD) technique compatible with a variety of monomers, including monomers with chemically functional moieties such as amine and epoxy groups. The technique allows for deposition of polymeric films on a wide variety of substrates/devices and provides an alternative for other coating/deposition methods that are incompatible with certain substrates/devices and/or do not provide adequate control over the resulting polymeric film. The provided method is advantageous in that it is applicable to fabrication of hybrid devices and is compatible with microfabrication technology, including that in clean-room settings. The invention provided herein is directed to a method that satisfies the need for a low-temperature bonding technique for wafers and the like that does not require application of an electric voltage or current and one that may overcome the lack of adequate control resulting in uneven distribution of an adhesive on planar, three-dimensional and other non-planar substrates.

In one embodiment the method for solvent-free bonding of substrates, comprises a) depositing a polymeric film on a first surface of a first substrate and optionally depositing a polymeric film on a first surface of a second substrate, wherein depositing the polymeric film comprises using initiated chemical vapor deposition; b) optionally aging each substrate comprising a deposited polymeric film at a temperature above the glass transition temperature of the deposited polymeric film until an amount of included monomers and/or short-chain polymers in the polymeric film is released; and c) bonding the first substrate to the second substrate by contacting the first surface of the first substrate with the first surface of the second substrate.

In some embodiments, a polymeric film is not deposited on the first surface of the second substrate. In some embodiments, a polymeric film is deposited on the first surface of the second substrate.

In some embodiments, the first surface of each substrate is cleaned to remove surface contamination prior to depositing the polymeric film.

In some embodiments, the first surface of each substrate is cleaned using plasma or a chemical cleaning solution.

In some embodiments, the polymeric film on the first surface of the first substrate and the polymeric film on the first surface of the second substrate are the same. In some embodiments, the polymeric film on the first surface of the first substrate and the polymeric film on the first surface of the second substrate are different.

In some embodiments, the polymeric film is deposited at a substrate temperature of at least 0° C. and no more than 100° C. In some embodiments, the polymeric film is deposited at a substrate temperature of at least 10° C. and no more than 50° C.

In some embodiments, deposition chamber temperature is at least 5° C. higher than substrate temperature.

In some embodiments, deposition chamber pressure is at least 1 mTorr and no more than 1000 mTorr. In some embodiments, deposition chamber pressure is at least 100 mTorr and no more than 800 mTorr.

In some embodiments, monomer and initiator for preparing the polymeric film are introduced to the deposition chamber at a monomer flow rate and an initiator flow rate that provides a monomer/initiator molar ratio of at least 1 and no more than 30.

In some embodiments, the monomer/initiator molar ratio is at least 2 and no more than 15.

In some embodiments, the monomer flow rate is held constant.

In some embodiments, the initiator flow rate is held constant.

In some embodiments, the monomer flow rate is varied.

In some embodiments, the initiator flow rate is varied.

In a specific embodiment, the monomer flow rate is held constant while the initiator flow rate is varied. Suitable variable and constant flow rates can be determined by the skilled artisan.

In some embodiments, the deposited polymeric film is at least 5 nm and no more than 15 μm thick. In some embodiments, the deposited polymeric film is at least 50 nm and no more than 500 nm thick. In some embodiments, the deposited polymeric film is at least 100 nm and no more than 300 nm thick.

In some embodiments, the temperature above the glass transition temperature of the deposited polymeric film is at least 10° C. over the glass transition temperature of the deposited polymeric film.

In some embodiments, the temperature above the glass transition temperature of the deposited polymeric film is at least 25° C. over the glass transition temperature of the deposited polymeric film.

In some embodiments, the temperature above the glass transition temperature of the deposited polymeric film is at least 50° C. over the glass transition temperature of the deposited polymeric film.

In some embodiments, the temperature above the glass transition temperature of the deposited polymeric film is at least 50° C.

In some embodiments, the temperature above the glass transition temperature of the deposited polymeric film is at least 100° C.

In some embodiments, the temperature above the glass transition temperature of the deposited polymeric film is at least 150° C.

In some embodiments, the substrate is aged at temperature above the glass transition temperature of the deposited polymeric film for at least 5 minutes.

In some embodiments, the substrate is aged at temperature above the glass transition temperature of the deposited polymeric film for at least 10 minutes.

In some embodiments, the amount of included monomers and/or short-chain polymers in the polymeric film released is at least 30% by weight of the included monomers and/or short-chain polymers. In some embodiments, the amount of included monomers and/or short-chain polymers in the polymeric film released is at least 50% by weight of the included monomers and/or short-chain polymers.

In some embodiments, the significant amount of included monomers and/or short-chain polymers in the polymeric film released is at least 75% by weight of the included monomers and/or short-chain polymers.

In some embodiments, contacting the first surface of the first substrate with the first surface of the second substrate comprises contacting with an applied force of at least 100 N.

In some embodiments, contacting the first surface of the first substrate with the first surface of the second substrate comprises contacting with an applied force of at least 1000 N.

In some embodiments, contacting the first surface of the first substrate with the first surface of the second substrate comprises contacting with an applied force of at least 5000 N.

In some embodiments, contacting the first surface of the first substrate with the first surface of the second substrate further comprises contacting at a temperature of at least 10° C. over the glass transition temperature of at least one deposited polymeric film.

In some embodiments, contacting the first surface of the first substrate with the first surface of the second substrate further comprises contacting at a temperature of at least 25° C. over the glass transition temperature of at least one deposited polymeric film.

In some embodiments, contacting the first surface of the first substrate with the first surface of the second substrate further comprises contacting at a temperature of at least 50° C. over the glass transition temperature of at least one deposited polymeric film.

In some embodiments, contacting the first surface of the first substrate with the first surface of the second substrate further comprises contacting at a temperature of at least 50° C.

In some embodiments, contacting the first surface of the first substrate with the first surface of the second substrate further comprises contacting at a temperature of at least 100° C.

In some embodiments, contacting the first surface of the first substrate with the first surface of the second substrate further comprises contacting at a temperature of at least 150° C.

In some embodiments, contacting the first surface of the first substrate with the first surface of the second substrate further comprises contacting under applied heat and pressure for at least 5 minutes.

In some embodiments, contacting the first surface of the first substrate with the first surface of the second substrate further comprises contacting under applied heat and pressure for at least 10 minutes.

In some embodiments, contacting the first surface of the first substrate with the first surface of the second substrate further comprises cooling the substrates to room temperature under applied pressure. In some embodiments, the composition of the first substrate and the composition of the second substrate is the same.

In some embodiments, the composition of the first substrate and the composition of the second substrate are different.

In some embodiments, the composition of the first substrate, the second substrate, or both the first and second substrates is selected from the group consisting of silicon-based materials, polyethylene terephthalate (PET), polyethylene naphthalate (PEN), polycarbonate (PC), polyethersulphone (PES), polycyclic olefin (PCO), polyimide (KAPTON®), polyethyleneimine (PEI), graphene, carbon nanotubes, and metal foils.

In some embodiments, the composition of both the first and second substrates is silicon.

In some embodiments, the deposited polymeric film is selected from the group consisting of polyacrylates, polydiacrylates, polymethacrylates, polystyrenes, and polyvinyls.

In some embodiments, the deposited polymeric film is a poly(alkyl methacrylate). In some embodiments, the deposited polymeric film is poly(neopentyl methacrylate).

Also provided herein is a bonded structure, comprising at least two substrates (i.e., at least a first substrate and a second substrate), either the same or different, bonded together with a polymeric film, wherein the substrates comprise a material selected from the group consisting of silicon-based materials, polyethylene terephthalate (PET), polyethylene naphthalate (PEN), polycarbonate (PC), polyethersulphone (PES), polycyclic olefin (PCO), polyimide (KAPTON®), polyethyleneimine (PEI), graphene, carbon nanotubes, and metal foils, wherein the polymeric film is selected from the group consisting of polyacrylates, polydiacrylates, polymethacrylates, polystyrenes, and polyvinyls, and wherein the structure comprises a void area of less than 5%.

In some embodiments, the bonded structure has enough integrity to withstand chemical mechanical planarization. In some embodiments, the void area of the bonded structure does not increase after chemical mechanical planarization.

In some embodiments, adhesion energy of the polymeric film is at least 175 mJ/m$^2$ at room temperature.

In some embodiments, adhesion energy of the polymeric film is at least 350 mJ/m² at room temperature.

In some embodiments, adhesion energy of the polymeric film is at least 175 mJ/m² at 350° C.

In some embodiments, adhesion energy of the polymeric film is at least 350 mJ/m² at 350° C.

Before the invention is described in greater detail, it should be understood by persons having ordinary skill in the art to which the invention pertains that the invention is not limited to the particular embodiments described and/or illustrated herein, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood by persons having ordinary skill in the art to which the invention pertains that the terminology used herein is for the purpose of describing the invention and particular embodiments thereof, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the claimed invention, or embodiments thereof. For example, "first," "second," and "third" elements or steps need not necessarily appear in that order, and the invention, or embodiments thereof, need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

For clarity of disclosure, and not by way of limitation, the detailed description of the invention is divided into the subsections set forth below.

5.1. Definitions and Abbreviations

Unless defined otherwise, all technical and scientific terms used herein have the same meaning as commonly understood by persons of ordinary skill in the art to which the invention pertains.

CMP, chemical-mechanical planarization or polishing
iCVD, initiated chemical vapor deposition
MEMS, microelectromechanical systems
NEMS, nanoelectromechanical systems
NPMA, neopentylmethacrylate
$P_m/P_{sat}$, ratio of monomer partial pressure to its saturated partial pressure at system temperature
pGMA, polyglycidyl methylmethacrylate
pNPMA or PnPMA, poly(neopentyl methacrylate)
SAB, solvent-less adhesive bonding
SAM, scanning acoustic microscopy
sccm, standard cubic centimeters per minute
TBPO, tert-butyl peroxide (aka di-tert-butyl peroxide)
$T_g$, glass transition temperature 5.2. Methods for Solvent-Free Bonding of Substrates Provided herein are bonded substrates and methods for solvent-free bonding or solvent-less adhesive bonding (SAB) of substrates. In one embodiment, a low-temperature bonding technique is provided for wafers and the like that does not require application of an electric voltage or current, and that is insensitive to surface topography. The low-temperature bonding technique provided herein may be applied to planar, three-dimensional and other non-planar substrates and be deposited in a controlled manner to provide thin films from nanometers up to several micrometer thicknesses.

In one embodiment, the method for solvent-free bonding of substrates, comprises a) using iCVD to deposit a polymeric film on a first surface of a first substrate and, optionally, to deposit a polymeric film on a first surface of a second substrate and b) bonding the first substrate to the second substrate by contacting the first surface of the first substrate with the first surface of the second substrate.

FIG. 1 provides a schematic of exemplary methods of bonding substrates including thermoplastic bonding with poly(neopentyl methacrylate) and covalent bonding through imine (e.g., primary aldimine) formation, which exemplary methods of bonding are described in further detail hereinbelow.

Substrates suitable for solvent-free bonding are varied and include, but are not limited to, silicon-based materials, polyethylene terephthalate (PET), polyethylene naphthalate, (PEN), polycarbonate (PC), polyethersulphone (PES), polycyclic olefin (PCO), polyimide (KAPTON®), polyethyleneimine (PEI), graphene, carbon nanotubes, and metal foils. Any of the foregoing substrates may be placed inside an iCVD chamber and subjected to iCVD to produce polymeric films on the subject substrates. Depending upon the substrate, and in accordance with common industrial practice, the substrate may need to be pre-cleaned and/or pre-baked prior to placement in the iCVD chamber.

Optionally, the initial surface of the substrate may be either modified or not modified prior to iCVD. Modification may include, but is not limited to pre-treating the initial surface of the substrate with adhesion promotors and/or other iCVD polymers. In some embodiments, the initial surface of the substrate is modified, the modification to the initial surface of the substrate comprising addition of a 1-5 nm thick layer of a surface-anchoring molecule. In such embodiments, the surface-anchoring molecule may be a siloxane (e.g., vinyltriethoxysilane or aminomethoxysilane) comprising reactive groups (e.g., vinyl or amine moieties) that may be used to chemically link to the iCVD polymer. The surface-anchoring molecule may also be one with chemical groups that afford improved wetting properties than the underlying initial surface of the substrate.

As shown in FIG. 2, a substrate with a modified or unmodified surface may be placed on a substrate stage of an iCVD chamber and cooled in preparation for iCVD. The temperature of the substrate and/or substrate stage is important in determining the amount of monomer adsorbed onto the substrate (through influence over $P_m/P_{sat}$), and, thus, affects the deposition rate and degree of polymerization during deposition.

In some embodiments, the substrate and/or substrate stage may be held at a temperature of at least 0° C., 5° C., 10° C., 15° C., 20° C., 25° C., 30° C., 35° C., 40° C., 45° C., 50° C., 55° C., 60° C., 65° C., 70° C., 75° C., 80° C., 85° C., 90° C., or 95° C. during deposition. In some embodiments, the substrate and/or substrate stage may be held at a temperature of no more than 100° C., 95° C., 90° C., 85° C., 80° C., 75° C., 70° C., 65° C., 60° C., 55° C., 50° C., 45° C., 40° C., 35° C., 30° C., 25° C., 20° C., 15° C., 10° C., or 5° C. during deposition.

Combinations of the foregoing may also be used to describe ranges of temperatures at which the substrate and/or substrate stage may be held during deposition. For example, the substrate and/or substrate stage may be held at a temperature of at least 0° C. and no more than 100° C. (i.e., between 0° C. and 100° C.) during deposition, such as at least 5° C. and no more than 75° C. (i.e., between 5° C. and 75° C.) or at least 10° C. and no more than 50° C. (i.e., between 10° C. and 50° C.).

As shown in FIG. 2 the substrate and/or substrate stage may be cooled using a recirculating coolant. The choice of temperature for the substrate and/or substrate stage depends, in part, upon the vapor pressure of the chosen monomer, which monomers are discussed in more detail herein below.

As shown in FIG. 2, an array of resistively heated filaments is suspended above the substrate stage, which filaments, when heated, act to thermally decompose an initiator (e.g., di-tert-butyl peroxide) and initiate gas-phase polymerization. In some embodiments, the array of resistively heated filaments may be suspended at least 0.1", 0.2", 0.3", 0.4", 0.5", 0.6", 07", 0.8", 0.9", 1.0", 1.1", 1.2", 1.3", 1.4", 1.5", 1.6", 1.7", 1.8", or 1.9" above the substrate or substrate stage during deposition. In some embodiments, the array of resistively heated filaments may be suspended no more than 2.0", 1.9", 1.8", 1.7", 1.6", 1.5", 1.4", 1.3", 1.2", 1.1", 1.0", 0.9", 0.8", 0.7", 0.6", 0.5", 0.4", 0.3", or 0.2" above the substrate or substrate stage during deposition.

Combinations of the foregoing may also be used to describe ranges of heights at which the array of resistively heated filaments may be suspended above the substrate or substrate stage during deposition. For example, the array of resistively heated filaments may be suspended at least 0.1" and no more than 2.0" (i.e., between 0.1" and 2.0") above the substrate or substrate stage during deposition, such as at least 0.5" and no more than 2.0" (i.e., between 0.5" and 2.0") or at least 0.5" and no more than 1.0" (i.e., between 0.5" and 1.0") above the substrate or substrate stage. In some embodiments, the array of resistively heated filaments may be held at a temperature of at least 25° C., 50° C., 75° C., 100° C., 125° C., 150° C., 175° C., 200° C., 225° C., 250° C., 275° C., 300° C., 325° C., 350° C., 375° C., 400° C., 425° C., 450° C., or 475° C. to thermally decompose the initiator. In some embodiments, the array of resistively heated filaments may be held at a temperature of no more than 500° C., 475° C., 450° C., 425° C., 400° C., 375° C., 350° C., 325° C., 300° C., 275° C., 250° C., 225° C., 200° C., 175° C., 150° C., 125° C., 100° C., 75° C., 50° C., or 25° C. to thermally decompose the initiator.

Combinations of the foregoing may also be used to describe ranges of temperatures at which the array of resistively heated filaments may be held during deposition. For example, the array of resistively heated filaments may be held at a temperature of at least 25° C. and no more than 500° C. (i.e., between 25° C. and 500° C.) during deposition, such as at least 100° C. and no more than 400° C. (i.e., between 100° C. and 400° C.) or at least 150° C. and no more than 300° C. (i.e., between 150° C. and 300° C.). Such temperatures may be determined by the choice of initiator, which may vary.

Any thermally-labile initiator that can be vaporized with a liquid-vapor atomizer or liquid-gas bubbler or sublimation and subsequently introduced to an iCVD chamber for thermal decomposition at the array of resistively heated filaments is a suitable initiator for use with the methods provided herein. Such initiators include, but are not limited to, organic peroxides such as di-tert-butyl peroxide and dicumyl peroxide; mercaptans such as tert-butyl mercaptan, di-tert-butyl disulfide; and amines such as triethylamine. The chosen initiator is introduced to the iCVD chamber during deposition through the top of the iCVD chamber as shown in FIG. 2 ("monomer and initiator feed"). The chosen initiator is introduced together with the chosen monomer, optionally in an inert carrier gas such as nitrogen or argon.

Any monomer that can be introduced in vapor-phase, with a liquid-vapor atomizer or liquid-gas bubbler or via sublimation, and subsequently introduced to an iCVD chamber without thermal decomposition at the array of resistively heated filaments (i.e., thermal decomposition below the temperature chosen for thermal decomposition of the initiator) is a suitable monomer for use with the methods provided herein. Such monomers include, but are not limited to, acrylate monomers such as acrylic acid, salts of acrylic acid, and esters of acrylic acid; alkyl methacrylate monomers such as methyl methacrylate, neopentyl methacrylate, and glycidyl methacrylate; diacrylate monomers such as ethylene glycol dicyclopentenyl ether methacrylate; acrylamide monomers; alkyl acrylamide monomers such as methacrylamide and N-isopropylacrylamide; vinyl/allyl monomers such as 3,4-epoxy-1-butene, allylamine, and tert-butyl N-allylcarbamate; and styrene-type monomers such as 4-vinyl aniline.

Further consideration to monomer choice depends upon the desired polymeric film, which may also vary widely. For example, any one or more monomers of neopentyl methacrylate, methyl methacrylate, methacrylamide, or N-isopropylacrylamide may be used for thermoplastic bonding; however, such monomers are not limited to thermoplastic bonding. In another example, any one or more monomers of 4-vinylaniline, glycidyl methacrylate, 2-isocyanatoethyl methacrylate, tert-butyl N-allylcarbamate, 2-allyloxybenzaldehyde, and ethylene glycol dicyclopentenyl ether methacrylate may be used for covalent bonding; however, such monomers are not limited to covalent bonding. Monomer choice is described in further detail herein below.

The chosen monomer is introduced to the iCVD chamber during deposition through the top of the iCVD chamber as shown in FIG. 2 ("monomer and initiator feed"). The chosen monomer is introduced together with the chosen initiator, optionally in an inert carrier gas such as nitrogen or argon.

With respect to the introduction of the monomer and initiator to the iCVD chamber, the molar ratio of monomer/initiator can be a parameter used to control deposition rate and weight average molecular weight of the resulting polymeric film. The amount of monomer and initiator introduced to the iCVD chamber may be controlled at the source, for example, by an isolation valve and mass-flow controller for each of the monomer source and the initiator source. In some embodiments, the monomer flow rate and the initiator flow rate may be selected to provide a monomer/initiator molar ratio to the iCVD chamber of at least 0.5, 1, 2, 3, 4, 5, 6, 7, 8, 9, 10, 11, 12, 13, 14, 15, 20, 25, 30, 35, 40, or 45 during deposition. In some embodiments, the monomer flow rate and the initiator flow rate may be selected to provide a monomer/initiator molar ratio to the deposition chamber of no more than 50, 45, 40, 35, 30, 25, 20, 15, 14, 13, 12, 11, 10, 9, 8, 7, 6, 5, 4, 3, 2, or 1 during deposition.

Combinations of the foregoing may also be used to describe the monomer/initiator molar ratio of monomer and initiator mixture provided to the iCVD chamber during deposition. For example, the monomer flow rate and the initiator flow rate may be selected to provide a monomer/initiator molar ratio to the iCVD chamber of at least 0.5 and no more than 50 (i.e., between 0.5 and 50) during deposition, such as a monomer/initiator molar ratio of at least 1 and no more than 30 (i.e., between 1 and 30) or a monomer/initiator molar ratio of at least 2 and no more than 15 (i.e., between 2 and 15). The foregoing monomer/initiator molar ratios may be achieved by adjusting the monomer flow rate, the initiator flow rate, or both the monomer and initiator flow rates. For example, in adjusting monomer and initiator flow rates for a desired monomer/initiator molar ratio, the monomer flow rate may be held constant while the initiator flow rate is varied. In some embodiments, the monomer flow rate is adjusted such that monomer is provided to the iCVD chamber at more than 0.1, 0.5, 1, 2, 3, 4, 5, 6, 7, 8, 9, 10, 11, 12, 13, 14, 15, 16, 17, 18, 19, 20, 22, 24, 26, 28, 30, 32, 34, 36, 38, 40, 42, 44, 46, or 48 sccm during deposition. In some embodiments, the monomer flow rate is adjusted such that monomer is provided to the iCVD chamber at no more than 50, 48, 46, 44, 42, 40, 38, 36, 34, 32, 30, 28, 26, 24, 22, 20, 19, 18, 17, 16, 15, 14, 13, 12, 10, 9, 8, 7, 6, 5, 4, 3, 2, 1, or 0.5 sccm during deposition.

Combinations of the foregoing may also be used to describe the flow rate of the monomer provided to the iCVD chamber. For example, the monomer flow rate may be adjusted to provide monomer to the iCVD chamber at more than 0.1 sccm and no more than 50 (i.e., between 0.1 sccm and 50 sccm) during deposition, such as more than 5 sccm and no more than 20 or more than 10 sccm and no more than 20. In some embodiments, the initiator flow rate is adjusted such that initiator is provided to the iCVD chamber at more than 0.1, 0.5, 1, 2, 3, 4, 5, 6, 7, 8, 9, 10, 11, 12, 13, 14, 15, 16, 17, 18, 19, 20, 22, 24, 26, 28, 30, 32, 34, 36, 38, 40, 42, 44, 46, or 48 sccm during deposition. In some embodiments, the initiator flow rate is adjusted such that initiator is provided to the iCVD chamber at no more than 50, 48, 46, 44, 42, 40, 38, 36, 34, 32, 30, 28, 26, 24, 22, 20, 19, 18, 17, 16, 15, 14, 13, 12, 10, 9, 8, 7, 6, 5, 4, 3, 2, 1, or 0.5 sccm during deposition.

Combinations of the foregoing may also be used to describe the flow rate of the initiator provided to the iCVD chamber. For example, the initiator flow rate may be adjusted to provide initiator to the iCVD chamber at more than 0.1 sccm and no more than 50 (i.e., between 0.1 sccm and 50 sccm) during deposition, such as a more than 5 sccm and no more than 20 or more than 10 sccm and no more than 20.

During deposition, the iCVD chamber may be held at a reduced pressure as evidenced by the vacuum pump at the bottom of the iCVD chamber of FIG. 2. While not shown in FIG. 2, a chamber pressure gauge with a feedback control loop and a throttling valve in line with vacuum pump may also be used to operate the iCVD chamber at reduced pressure. Operation of the iCVD chamber at a reduced pressure allows for an even draw of the monomer and initiator from the monomer and initiator feed.

In some embodiments, the iCVD chamber may be held at a reduced pressure of at least 0.1 mTorr, 1 mTorr, 10 mTorr, 50 mTorr, 100 mTorr, 200 mTorr, 300 mTorr, 400 mTorr, 500 mTorr, 600 mTorr, 700 mTorr, 800 mTorr, 900 mTorr, 1000 mTorr/1 Torr, 2 Torr, 4 Torr, 6 Torr, 8 Torr, 10 Torr, 12 Torr, 14 Torr, 16 Torr or 18 Torr during deposition.

In some embodiments, the iCVD chamber may be held at a reduced pressure of no more than 20 Torr, 18 Torr, 16 Torr, 14 Torr, 12 Torr, 10 Torr, 8 Torr, 6 Torr, 4 Torr, 2 Torr, 1 Torr/1000 mTorr, 900 mTorr, 800 mTorr, 700 mTorr, 600 mTorr, 500 mTorr, 400 mTorr, 300 mTorr, 200 mTorr, 100 mTorr, 50 mTorr, 10 mTorr, or 1 mTorr during a deposition operation.

Combinations of the foregoing may also be used to describe ranges of reduced pressures at which the iCVD chamber may be held during deposition. For example, the iCVD chamber may be held at a reduced pressure of at least 100 mTorr and no more than 20 Torr (i.e., between 100 mTorr and 20 Torr) during deposition, such as at least 200 mTorr and no more than 5 Torr (i.e., between 200 mTorr and 5 Torr) or at least 500 mTorr and no more than 1 Torr (i.e., between 500 mTorr and 1 Torr). In some embodiments, for example, the iCVD chamber may be held at a reduced pressure of at least 100 mTorr and no more than 800 mTorr.

During deposition, the iCVD chamber may be held at a temperature above that of the substrate and/or substrate stage. Operation of the iCVD chamber in this way avoids adsorption of monomer on internal chamber surfaces, which may otherwise cause cross-contamination when working with successive samples requiring different monomers. In some embodiments, the iCVD chamber may be held at a temperature of at least 5° C., 10° C., 15° C., 20° C., 25° C., 30° C., 35° C., 40° C., 45° C., 50° C., 55° C., 60° C., 65° C., 70° C., 75° C., 80° C., 85° C., 90° C., or 95° C. above the substrate and/or substrate stage temperature.

In some embodiments, the iCVD chamber may be held at a temperature no more than 100° C., 95° C., 90° C., 85° C., 80° C., 75° C., 70° C., 65° C., 60° C., 55° C., 50° C., 45° C., 40° C., 35° C., 30° C., 25° C., 20° C., 15° C., or 10° C. above the substrate and/or substrate stage temperature.

Combinations of the foregoing may also be used to describe ranges of temperatures at which the iCVD chamber may be held above that of the substrate and/or substrate stage. For example, the iCVD chamber may be held at a temperature of at least 5° C. and no more than 100° C. (i.e., between 5° C. and 100° C.) above the substrate and/or substrate stage temperature, such as at least 10° C. and no more than 75° C. (i.e., between 10° C. and 75° C.) or at least 25° C. and no more than 50° C. (i.e., between 25° C. and 50° C.).

By adjusting the foregoing parameters, the polymeric film deposited on the substrate and the characteristics of that polymeric film may be made to vary widely. Polymeric films that may be deposited by iCVD include, but are not limited to, poly(acrylate) polymers, which may vary in both the ester/salt moiety and substitution on the C—C bond corresponding to the $\alpha,\beta$-unsaturated bond of the monomer precursor; poly(alkyl methacrylate) polymers, a sub-genus of poly(acrylate) polymers including, for example, poly (neopentyl methacrylate); poly(diacrylate) polymers, which may vary in both the linking ester moiety and substitution on the C—C bond corresponding to the $\alpha, \beta$-unsaturated bond of the monomer precursor; poly(styrene) polymers, which may vary in both the substitution on the phenyl group and the C—C bond corresponding to the C=C double-bond of the monomer precursor; poly(vinyl), which may vary in the C—C bond corresponding to the C=C double-bond of the monomer precursor.

The foregoing polymers may further contain additional functionality conferring chemical reactivity to the deposited polymeric film. For example, as provided hereinabove, glycidyl methacrylate may be used as an iCVD monomer, and, as such, may be polymerized under conditions provided herein to yield a polymeric film of poly(glycidyl methacrylate) on a substrate, the epoxide groups of which may react with moieties such as the amine groups of poly(allylamine) or carboxyl groups of poly(methacrylic acid) or hydroxyl groups of poly(hydroxyethylmethacrylate), which may be deposited on another substrate for covalent bonding of a substrate pair. Because the polymeric film may vary widely, so, too, may the characteristics of the polymeric film.

The thickness of a polymeric film on a substrate may be adjusted by adjusting some of the deposition parameters described hereinabove. In some embodiments, a polymeric film deposited on a substrate may be at least 5 nm, 10 nm, 15 nm, 20 nm, 25 nm, 50 nm, 75 nm, 100 nm, 150 nm, 200 nm, 250 nm, 300 nm, 400 nm, 500 nm, 600 nm, 700 nm, 800 nm, 900 nm, 1000 nm/1 µm, 2 µm, 3 µm, 4 µm, 5 µm, 6 µm, 7 µm, 8 µm, 9 µm, 10 µm, 11 µm, 12 µm, 13 µm, 14 µm, 15 µm, 16 µm, 17 µm, 18 µm, or 19 µm thick. In some embodiments, a polymeric film deposited on a substrate may be no more than 20 µm, 19 µm, 18 µm, 17 µm, 16 µm, 15 µm, 14 µm, 13 µm, 12 µm, 11 µm, 10 µm, 9 µm, 8 µm, 7 µm, 6 µm, 5 µm, 4 µm, 3 µm, 2 µm, 1 µm/1000 nm, 900 nm, 800 nm, 700 nm, 600 nm, 500 nm, 400 nm, 300 nm, 250 nm, 200 nm, 150 nm, 100 nm, 75 nm, 50 nm, 25 nm, 20 nm, 15 nm, 10 nm thick.

Combinations of the foregoing may also be used to describe the thickness of a polymeric film deposited on a substrate. For example, a polymeric film deposited on a substrate may be at least 5 nm and no more than 20 µm (i.e., between 5 nm and 20 µm) thick, such as at least 50 nm and no more than 1 µm/1000 nm (i.e., between 50 nm and 1 µm/1000 nm), at least 50 nm and no more than 500 nm (i.e., between 50 nm and 500 nm), or at least 100 nm and no more than 300 nm (i.e., between 100 nm and 300 nm).

With respect to bonding a pair of substrates, each substrate of the substrate pair may comprise a polymeric film deposited using iCVD as described hereinabove; however, at least one substrate of the substrate pair should have an iCVD-deposited polymeric film. For substrate pairs in which each substrate comprises an iCVD-deposited polymeric film, each substrate may have the same polymeric film or a different polymeric film. Having the same polymeric film includes having the same polymeric film in terms of identity (e.g., pNPMA or pGMA), and one that is substantially similar to a person having ordinary skill in the art with respect to properties (e.g., $T_g$, weight average molecular weight, chemical reactivity, etc.) and certain characteristics such as thickness. Having a different polymeric film includes having a different polymeric film in terms of identity, and one that is substantially different to a person having ordinary skill in the art with respect to properties (e.g., $T_g$, weight average molecular weight, chemical reactivity, etc.), or certain characteristics, such as thickness. While not necessary to accomplish bonding between a pair of substrates, it has been found that aging each substrate of a substrate pair at an elevated temperature for a set amount of time prior to bonding may facilitate a strong bond (e.g., as evidenced by adhesion energy) between the substrate pair. Mechanistically, it is thought that aging the substrate at an elevated temperature for a set amount of time releases a significant amount of monomers and/or short-chain polymers included in the polymeric film. Mechanistically, it is also thought that aging the substrate may cause weak chemical linkages to break that either lead to lower molecular weight compounds that can be removed/desorbed from the film, or form new bonds leading to higher molecular weight compounds/polymers that improves the stability of the film. With respect to temperature, it has been found that heating a substrate at a temperature above $T_g$ of the substrate's polymeric film is particularly effective.

In some embodiments, the substrate may be heated at a temperature of at least 5° C., 10° C., 15° C., 20° C., 25° C., 30° C., 40° C., 50° C., 60° C., 70° C., 80° C., 90° C., 100° C., 125° C., 150° C., 175° C., 200° C., or 225° C. over $T_g$ of the deposited polymeric film.

In some embodiments, the substrate may be heated at a temperature of no more than 250° C., 225° C., 200° C., 175° C., 150° C., 125° C., 100° C., 90° C., 80° C., 70° C., 60° C., 50° C., 40° C., 30° C., 25° C., 20° C., 15° C., or 10° C. over $T_g$ of the deposited polymeric film.

Combinations of the foregoing may also be used to describe a temperature range within which the substrate may be heated over $T_g$ of the deposited polymeric film. For example, a substrate may be heated within a temperature of at least 5° C. and no more than 250° C. (i.e., between 5° C. and 250° C.) over $T_g$ of the deposited polymeric film, such as at least 10° C. and no more than 100° C. (i.e., between 10° C. and 100° C.) or at least 10° C. and no more than 50° C. (i.e., between 10° C. and 50° C.). It may be convenient to describe this in absolute temperatures (i.e., not relative to $T_g$) as well.

In some embodiments, the substrate may be heated at a temperature, optionally over $T_g$ of the deposited polymeric film, wherein that temperature is at least 25° C., 50° C., 75° C., 100° C., 125° C., 150° C., 175° C., 200° C., 225° C., 250° C., 275° C., 300° C., 325° C., 350° C., 375° C., 400° C., 425 450° C., or 475° C.

In some embodiments, the substrate may be heated at a temperature, optionally over $T_g$ of the deposited polymeric film, wherein that temperature is no more than 500° C., 475° C., 450° C., 425° C., 400° C., 375° C., 350° C., 325° C., 300° C., 275° C., 250° C., 225° C., 200° C., 175° C., 150° C., 125° C., 100° C., 75° C., or 50° C.

Combinations of the foregoing may also be used to describe an absolute temperature range within which the substrate may be heated, optionally over $T_g$ of the deposited polymeric film. For example, a substrate may be heated within a temperature range, optionally over $T_g$ of the deposited polymeric film, wherein that temperature range is at least 5° C. and no more than 500° C. (i.e., between 5° C. and 500° C.), such as at least 10° C. and no more than 300° C. (i.e., between 10° C. and 375° C.) or at least 50° C. and no more than 175° C. (i.e., between 50° C. and 175° C.).

With respect to time, a substrate may be aged at an elevated temperature (e.g., absolute or relative to the polymeric film's $T_g$) or within an elevated temperature range until it is determined that a significant amount of included monomers and/or short-chain polymers in the polymeric film are released or another desired endpoint is achieved.

In some embodiments, it may be determined that aging a substrate at a foregoing temperature or temperature range for at least 5, 10, 15, 20, 25, 30, 40, or 50 minutes is sufficient to release or rearrange a significant amount of included monomers and/or short-chain polymers in the polymeric film.

In some embodiments, it may be determined that aging a substrate at a foregoing temperature or temperature range for no more than 60, 50, 40, 30, 25, 20, 15, or 10 minutes is sufficient to release or rearrange a significant amount of included monomers and/or short-chain polymers in the polymeric film.

Combinations of the foregoing may also be used to describe a sufficient amount of time to age substrate at an elevated temperature. For example, it may be determined that aging a substrate at a foregoing temperature or temperature range for at least 5 minutes and no more than 60 minutes is sufficient to release a significant amount of included monomers and/or short-chain polymers in the polymeric film, such as at least 5 minutes and no more than 30 minutes or at least 5 minutes and no more than 15 minutes.

In some embodiments, the amount of included monomers and/or short-chain polymers in the polymeric film released may be at least 5%, 10%, 15%, 20%, 25%, 30%, 35%, 40%, 45%, 50%, 55%, 60%, 65%, 70%, 75%, 80%, 85%, 90%, or 95% by weight of the included monomers and/or short-chain polymers.

In some embodiments, the amount of included monomers and/or short-chain polymers in the polymeric film released may be no more than 100%, 95%, 90%, 85%, 80%, 75%, 70%, 65%, 60%, 55%, 50%, 45%, 40%, 35%, 30%, 25%, 20%, 15%, 10%, or 5% by weight of the included monomers and/or short-chain polymers.

Combinations of the foregoing may also be used to describe the amount of included monomers and/or short-chain polymers in the polymeric film released by weight of the included monomers and/or short-chain polymers.

For example, in some embodiments, the amount of included monomers and/or short-chain polymers in the polymeric film released may be at least 5% and no more than 100% (e.g., between 5% and 100%) by weight of the included monomers and/or short-chain polymers, such as at least 20% and no more than 80% (e.g., between 20% and 80%), for example, at least 30% and no more than 75% (e.g., between 30% and 75%).

A reduction in volume may be used to describe the effect of aging on a polymeric film. In some embodiments, the volume of a polymeric film may be reduced by at least 5%, 10%, 15%, 20%, 25%, 30%, 35%, 40%, 45%, 50%, 55%, 60%, 65%, 70%, 75%, 80%, 85%, 90%, or 95% by aging for a time under an increased temperature. In some embodiments, the volume of a polymeric film may be reduced by no more than 100%, 95%, 90%, 85%, 80%, 75%, 70%, 65%, 60%, 55%, 50%, 45%, 40%, 35%, 30%, 25%, 20%, 15%, 10%, or 5% by aging for a time under an increased temperature. Combinations of the foregoing may also be used to describe the volume by which a polymeric film is reduced by aging for a time under an increased temperature. For example, in some embodiments, the volume of a polymeric film may be reduced by at least 5% and no more than 100% (e.g., between 5% and 100%) by aging for a time under an increased temperature, such as at least 20% and no more than 80% (e.g., between 20% and 80%), for example, at least 30% and no more than 75% (e.g., between 30% and 75%).

Whether a substrate comprising an iCVD-deposited polymeric film is aged or not to release or restructure included monomers and/or short-chain polymers, each substrate of a pair of substrates may be brought into contact with each other and bonded, optionally on a substrate dependent tool. Methods for bonding substrates provided herein comprise contacting a polymeric film on a first surface of a first substrate with a polymeric film on a first surface of a second substrate. Methods provided herein also encompass contacting the polymeric film on the first surface of the first substrate with a first surface of a third substrate, wherein the first surface of the third substrate lacks a polymeric film. Each substrate of a pair of substrates may be individually heated (e.g., at the same or a different temperature from the other) prior to contact with each other, optionally at the same temperature a substrate is aged, and immediately after aging. While heating may not be necessary in some embodiments (i.e., heating is optional when, for example, room temperature and a force described herein is sufficient), heating may be needed to activate certain polymeric films, especially if the polymeric films are thermoplastic adhesives.

In some embodiments, each substrate of a pair of substrates may be individually heated at a temperature of at least 25° C., 50° C., 75° C., 100° C., 125° C., 150° C., 175° C., 200° C., 225° C., 250° C., 275° C., 300° C., 325° C., 350° C., 375° C., 400° C., 425 450° C., or 475° C. prior to contacting the pair of substrates. In some embodiments, each substrate of a pair of substrates may be individually heated at a temperature of no more than 500° C., 475° C., 450° C., 425° C., 400° C., 375° C., 350° C., 325° C., 300° C., 275° C., 250° C., 225° C., 200° C., 175° C., 150° C., 125° C., 100° C., 75° C., or 50° C. prior to contacting the pair of substrates.

Combinations of the foregoing may also be used to describe ranges of temperatures for individually heating each substrate of a pair of substrates prior to contacting the pair of substrates. For example, each substrate of a pair of substrates may be individually heated at a temperature of at least 5° C. and no more than 500° C. (i.e., between 5° C. and 500° C.) prior to contacting the pair of substrates, such as at least 10° C. and no more than 300° C. (i.e., between 10° C. and 375° C.) or at least 50° C. and no more than 175° C. (i.e., between 50° C. and 175° C.). The foregoing temperatures may or may not be over $T_g$ of the substrate's polymeric film.

Subsequent to individually heating each substrate of a pair of substrates, if such heating is desired or needed, each substrate of the pair may be brought into contact with each other and bonded using an applied force, optionally on a substrate dependent tool. In some embodiments, a force of at least 100; 500; 1000; 2000; 3000; 4000; 5000; 6000; 7000; 8000; 9000; 10,000; 11,000; 12,000; 13,000; or 14,000 N may be applied to bond the pair of substrates in contact. In some embodiments, a force of no more than 15,000; 14,000; 13,000; 12,000; 11,000; 10,000; 9000; 8000; 7000; 6000; 5000; 4000; 3000; 2000; 1000; or 500 N may be applied to bond the pair of substrates in contact.

Combinations of the foregoing may also be used to describe ranges of force applied to bond the pair of substrates in contact. For example, a force of at least 100 N and no more than 15,000 N (i.e., between 100 N and 15,000 N) may be applied to bond the pair of substrates in contact, such as at least 1000 N and no more than 10,000 N (i.e., between 1000 N and 10,000 N) or at least 5,000 N and no more than 8,000 N (i.e., between 5,000 N and 8,000 N). The foregoing pressure applied to bond the pair of substrates may be applied for duration of time. In some embodiments, the pressure applied to bond the pair of substrates may be held for at least 5, 10, 15, 20, 25, 30, 40, or 50 minutes. In some embodiments, the pressure applied to bond the pair of substrates may be held for no more than 60, 50, 40, 30, 25, 20, 15, or 10 minutes. Combinations of the foregoing may also be used to describe how long the pressure applied to bond the pair of substrates may be held. For example, the pressure applied to bond the pair of substrates may be held at least 5 minutes and no more than 60 minutes, such as at least 5 minutes and no more than 30 minutes or at least 5 minutes and no more than 15 minutes. Once pressure is released, the bonded pair of substrates may be left to cool to room temperature.

5.3. Bonded Structures

The foregoing apparatus and methods provide a bonded structure (e.g., substrates bonded together using apparatus and methods described herein). The bonded structure may comprise at least two substrates (i.e., at least a first substrate and a second substrate), either the same or different, bonded together with a polymeric film, wherein the substrates comprise a material selected from the group consisting of silicon-based materials, polyethylene terephthalate (PET), polyethylene naphthalate (PEN), polycarbonate (PC), polyethersulphone (PES), polycyclic olefin (PCO), polyimide (KAPTON®), polyethyleneimine (PEI), graphene, carbon nanotubes, and metal foils, and the polymeric film is selected from the group consisting of polyacrylates, polydiacrylates, polymethacrylates, polystyrenes, and polyvinyls, and wherein the structure comprises a void area of less than 5%, such as less than 4%, for example, less than 3%, 2%, or 1%. Such a bonded structure has enough integrity to withstand chemical mechanical planarization as shown in FIGS. 5A and 5B, which provide scanning acoustic microscopy images of wafers bonded with poly(neopentyl methacrylate) after chemical mechanical planarization. As such, the void area of the bonded structure generally does not increase after chemical mechanical planarization.

In some embodiments, the adhesion energy of the polymeric film in a bonded structure may be at least 25, 50, 75, 100, 125, 150, 175, 200, 225, 250, 275, 300, 325, 350, 375, 400, 425, 450, or 475 mJ/m$^2$ at room temperature.

In some embodiments, the adhesion energy of the polymeric film in a bonded structure may be no more than 500, 475, 450, 425, 400, 375, 350, 325, 300, 275, 250, 225, 200, 175, 150, 125, 100, 75, or 50 mJ/m$^2$ at room temperature.

Combinations of the foregoing may also be used to describe the adhesion energy of the polymeric film in a bonded structure. For example, in some embodiments, the adhesion energy of the polymeric film in a bonded structure may be at least 25 and no more than 500 mJ/m$^2$ at room temperature (e.g., between 25 and 500 mJ/m$^2$ at room temperature), such as at least 100 and no more than 425 mJ/m$^2$ at room temperature (e.g., between 100 and 425 mJ/m$^2$ at room temperature), for example, at least 175 and no more than 350 mJ/m$^2$ at room temperature (e.g., between 175 and 350 mJ/m$^2$ at room temperature).

In some embodiments, the adhesion energy of the polymeric film in a bonded structure may be at least 25, 50, 75, 100, 125, 150, 175, 200, 225, 250, 275, 300, 325, 350, 375, 400, 425, 450, or 475 mJ/m$^2$ at 50° C.

In some embodiments, the adhesion energy of the polymeric film in a bonded structure may be no more than 500, 475, 450, 425, 400, 375, 350, 325, 300, 275, 250, 225, 200, 175, 150, 125, 100, 75, or 50 mJ/m$^2$ at 50° C.

Combinations of the foregoing may also be used to describe the adhesion energy of the polymeric film in a bonded structure. For example, in some embodiments, the adhesion energy of the polymeric film in a bonded structure may be at least 25 and no more than 500 mJ/m$^2$ at 50° C. (e.g., between 25 and 500 mJ/m$^2$ at 50° C.), such as at least 100 and no more than 425 mJ/m$^2$ at 50° C. (e.g., between 100 and 425 mJ/m$^2$ at 50° C.), for example, at least 175 and no more than 350 mJ/m$^2$ at 50° C. (e.g., between 175 and 350 mJ/m$^2$ at 50° C.).

In some embodiments, the adhesion energy of the polymeric film in a bonded structure may be at least 25, 50, 75, 100, 125, 150, 175, 200, 225, 250, 275, 300, 325, 350, 375, 400, 425, 450, or 475 mJ/m$^2$ at 100° C.

In some embodiments, the adhesion energy of the polymeric film in a bonded structure may be no more than 500, 475, 450, 425, 400, 375, 350, 325, 300, 275, 250, 225, 200, 175, 150, 125, 100, 75, or 50 mJ/m$^2$ at 100° C.

Combinations of the foregoing may also be used to describe the adhesion energy of the polymeric film in a bonded structure. For example, in some embodiments, the adhesion energy of the polymeric film in a bonded structure may be at least 25 and no more than 500 mJ/m$^2$ at 100° C. (e.g., between 25 and 500 mJ/m$^2$ at 100° C.), such as at least 100 and no more than 425 mJ/m$^2$ at 100° C. (e.g., between 100 and 425 mJ/m$^2$ at 100° C.), for example, at least 175 and no more than 350 mJ/m$^2$ at 100° C. (e.g., between 175 and 350 mJ/m$^2$ at 100° C.).

In some embodiments, the adhesion energy of the polymeric film in a bonded structure may be at least 25, 50, 75, 100, 125, 150, 175, 200, 225, 250, 275, 300, 325, 350, 375, 400, 425, 450, or 475 mJ/m$^2$ at 150° C.

In some embodiments, the adhesion energy of the polymeric film in a bonded structure may be no more than 500, 475, 450, 425, 400, 375, 350, 325, 300, 275, 250, 225, 200, 175, 150, 125, 100, 75, or 50 mJ/m$^2$ at 150° C.

Combinations of the foregoing may also be used to describe the adhesion energy of the polymeric film in a bonded structure. For example, in some embodiments, the adhesion energy of the polymeric film in a bonded structure may be at least 25 and no more than 500 mJ/m$^2$ at 150° C. (e.g., between 25 and 500 mJ/m$^2$ at 150° C.), such as at least 100 and no more than 425 mJ/m$^2$ at 150° C. (e.g., between 100 and 425 mJ/m$^2$ at 150° C.), for example, at least 175 and no more than 350 mJ/m$^2$ at 150° C. (e.g., between 175 and 350 mJ/m$^2$ at 150° C.).

In some embodiments, the adhesion energy of the polymeric film in a bonded structure may be at least 25, 50, 75, 100, 125, 150, 175, 200, 225, 250, 275, 300, 325, 350, 375, 400, 425, 450, or 475 mJ/m$^2$ at 200° C.

In some embodiments, the adhesion energy of the polymeric film in a bonded structure may be no more than 500, 475, 450, 425, 400, 375, 350, 325, 300, 275, 250, 225, 200, 175, 150, 125, 100, 75, or 50 mJ/m$^2$ at 200° C.

Combinations of the foregoing may also be used to describe the adhesion energy of the polymeric film in a bonded structure. For example, in some embodiments, the adhesion energy of the polymeric film in a bonded structure may be at least 25 and no more than 500 mJ/m$^2$ at 200° C. (e.g., between 25 and 500 mJ/m$^2$ at 200° C.), such as at least 100 and no more than 425 mJ/m$^2$ at 200° C. (e.g., between 100 and 425 mJ/m$^2$ at 200° C.), for example, at least 175 and no more than 350 mJ/m$^2$ at 200° C. (e.g., between 175 and 350 mJ/m$^2$ at 200° C.).

In some embodiments, the adhesion energy of the polymeric film in a bonded structure may be at least 25, 50, 75, 100, 125, 150, 175, 200, 225, 250, 275, 300, 325, 350, 375, 400, 425, 450, or 475 mJ/m$^2$ at 250° C.

In some embodiments, the adhesion energy of the polymeric film in a bonded structure may be no more than 500, 475, 450, 425, 400, 375, 350, 325, 300, 275, 250, 225, 200, 175, 150, 125, 100, 75, or 50 mJ/m$^2$ at 250° C.

Combinations of the foregoing may also be used to describe the adhesion energy of the polymeric film in a bonded structure. For example, in some embodiments, the adhesion energy of the polymeric film in a bonded structure may be at least 25 and no more than 500 mJ/m$^2$ at 250° C. (e.g., between 25 and 500 mJ/m$^2$ at 250° C.), such as at least 100 and no more than 425 mJ/m$^2$ at 250° C. (e.g., between 100 and 425 mJ/m$^2$ at 250° C.), for example, at least 175 and no more than 350 mJ/m$^2$ at 250° C. (e.g., between 175 and 350 mJ/m$^2$ at 250° C.).

In some embodiments, the adhesion energy of the polymeric film in a bonded structure may be at least 25, 50, 75, 100, 125, 150, 175, 200, 225, 250, 275, 300, 325, 350, 375, 400, 425, 450, or 475 mJ/m$^2$ at 300° C.

In some embodiments, the adhesion energy of the polymeric film in a bonded structure may be no more than 500, 475, 450, 425, 400, 375, 350, 325, 300, 275, 250, 225, 200, 175, 150, 125, 100, 75, or 50 mJ/m$^2$ at 300° C.

Combinations of the foregoing may also be used to describe the adhesion energy of the polymeric film in a bonded structure. For example, in some embodiments, the adhesion energy of the polymeric film in a bonded structure may be at least 25 and no more than 500 mJ/m$^2$ at 300° C.

(e.g., between 25 and 500 mJ/m$^2$ at 300° C.), such as at least 100 and no more than 425 mJ/m$^2$ at 300° C. (e.g., between 100 and 425 mJ/m$^2$ at 300° C.), for example, at least 175 and no more than 350 mJ/m$^2$ at 300° C. (e.g., between 175 and 500 mJ/m$^2$ at 350° C.).

In some embodiments, the adhesion energy of the polymeric film in a bonded structure may be at least 25, 50, 75, 100, 125, 150, 175, 200, 225, 250, 275, 300, 325, 350, 375, 400, 425, 450, or 475 mJ/m$^2$ at 350° C.

In some embodiments, the adhesion energy of the polymeric film in a bonded structure may be no more than 500, 475, 450, 425, 400, 375, 350, 325, 300, 275, 250, 225, 200, 175, 150, 125, 100, 75, or 50 mJ/m$^2$ at 350° C.

Combinations of the foregoing may also be used to describe the adhesion energy of the polymeric film in a bonded structure. For example, in some embodiments, the adhesion energy of the polymeric film in a bonded structure may be at least 25 and no more than 500 mJ/m$^2$ at 350° C. (e.g., between 25 and 500 mJ/m$^2$ at 350° C.), such as at least 100 and no more than 425 mJ/m$^2$ at 350° C. (e.g., between 100 and 425 mJ/m$^2$ at 350° C.), for example, at least 175 and no more than 350 mJ/m$^2$ at 350° C. (e.g., between 175 and 350 mJ/m$^2$ at 350° C.).

In some embodiments, methods provided herein may be used in wafer-wafer adhesive bonding as provided in Example 1. Persons having ordinary skill in the art to which the invention pertains should readily recognize that Example 1 may be modified and carried out using iCVD and bonding parameters described above. With respect to iCVD, for example, glycidyl methacrylate monomer may be used to deposit poly(glycidyl methacrylate) on a first surface of a first wafer and allylamine monomer may be used to deposit poly(allylamine) on a first surface of a second wafer. In such depositions, TBPO may be used as the initiator, or another organic initiator may be chosen from those provided hereinabove. Conditions such as wafer and/or wafer stage temperature, chamber temperature and pressure, monomer and initiator flow rate, monomer/initiator molar ratio, and the like may be optimized using parameters described hereinabove. With respect to bonding, when the poly(glycidyl methacrylate) and poly(allylamine) wafers are contacted and bonded under heat and pressure, each wafer of the pair of wafer becomes covalently bonded to each other by means of the amine groups on the second wafer opening the epoxide groups on the first wafer.

5.4. Utility

The methods and bonded structures provided herein may find use in adhesive bonding in semiconductor packaging and back end processes, which may encompass:

Polymeric films functioning as thermal adhesives (permanent, thermal compressive bonding);

Polymeric films functioning as temporary adhesives (reversible bonding);

Polymeric films functioning as chemical adhesives (for covalent/permanent bonding);

Polymeric films working as device layers (substrates) for fabricating flexible electronics;

Polymeric films to control/guide wetting properties of semiconductor and other solid substrates (for instance for improving wetting of liquid epoxy materials);

Polymeric films as underfill material;

Polymeric films for hermetic sealing;

Polymeric films for encapsulation of semiconductor devices;

Polymeric films (with/without reactive groups) improving adhesion and/or acting as anchoring layers for UV-curable inks; and Polymeric films functioning as dielectric materials in devices.

The following examples are offered by way of illustration and not by way of limitation. The examples are set forth so as to provide persons having ordinary skill in the art to which the invention pertains with a complete disclosure and description of how to make and use the invention. Efforts have been made to ensure accuracy with respect to numbers (e.g., amounts, temperature, etc.) used, but some experimental errors and deviations should be accounted for.

6. EXAMPLES 6.1 Example 1

Wafer-Wafer Bonding Using Poly(Neopentyl Methacrylate) (PnPMA) Thin Films

This example provides useful parameters for solvent-less polymerization of NPMA to produce pNPMA (also referred to herein as PnPMA) polymer films on 300 mm silicon wafer substrates that can serve as thermoplastic adhesives.

NPMA (>98%) and TBPO (>98%) were purchased from SAFC Hitech and used as received. High-purity argon (>99.99%) was purchased and used as the carrier gas, though high-purity nitrogen may also be also be used as a less expensive alternative.

iCVD

The deposition chamber was operated under reduced pressure, and had a series of resistively heated filaments suspended above a cooled substrate stage. The filaments were situated ~1" above the substrate and heated to 275±10° C. to be able to fully crack the TBPO initiator. During the deposition of pNPMA, the substrate was held at 15° C. The chamber was held at a higher temperature (60° C.) than the stage temperature to avoid monomer adsorption to the chamber surfaces. During deposition, the chamber pressure was maintained at 800 mTorr. High purity argon was used to introduce NPMA and TBPO vapors into the reaction chamber (either by using a liquid-vapor atomizer or a liquid-gas bubbler). The flow rates of NPMA (17 sccm) and argon were fixed while the flow rate of TBPO (2-9 sccm) was varied to give monomer/initiator molar ratios (M/I) between 2 and 15. All films generated using the above listed parameters had thermo-adhesive qualities.

Bonding

To demonstrate thermal bonding, a standard 300 mm bonding tool (EVG 540) was used where two wafers with 150 nm of pNPMA deposited were mounted on separate chucks and pre-heated to 150° C. for 15 min. The wafers were then brought together under mild vacuum and a force (7000 N) was applied to the back of the wafer chucks to bond the wafers. The wafers were held in position at 150° C. for 15 min, and left to cool to room temperature while still under applied force. Once the wafers cooled down, the force was removed, and the bonded wafer pair was recovered and analyzed using SAM imaging.

A similar bonding process (with less force) was also used to bond individual dies, which were diced into ~1" squares after pNPMA deposition (for use in pick and place die-die/die-wafer bonding).

FIG. 3 provides a table of adhesion energies for deposited poly(neopentyl methacrylate) films at different temperatures and applied forces. The adhesion of about 400 mJ/m$^2$ between silicon and iCVD pNPMA matches well with reported values for the system.

FIG. 4 provides a plot of applied force versus strain for four-point bend test of two silicon wafers bonded with a deposited poly(neopentyl methacrylate) (PnPMA).

Results and Discussion

This example demonstrated SAB wafer-wafer bonding of 300 mm silicon wafers using poly(neopentyl methacrylate) (PnPMA) thin films that were prepared via initiated chemical vapor deposition (iCVD). This bond is thermoadhesive, where heating the polymer above the glass transition temperature ($T_g$) allows polymer chains to tangle, which holds the substrates together. No other chemical bonds beyond intermolecular forces are involved in this type of adhesive bonding. $T_g$ for PnPMA was measured to be ~120° C. The bonding was performed at ~150° C. at 7000 N for 15 min. The adhesion energy was ~9 J/m2 and bond failure was at the polymer-substrate interface.

6.2. Example 2

Wafer-Wafer Bonding Using Polyglycidyl Methylmethacrylate (pGMA) Thin Films

This example demonstrates a method for producing a permanent, thermoset bond.

iCVD was used to deposit polyglycidyl methylmethacrylate (pGMA, FIG. 6), on blank and patterned (e.g., copper bond pads) 300 mm silicon wafers. The pGMA has chemical functional groups (epoxides) that provide the opportunity to chemically crosslink the material. This allows a permanent, thermoset bonding scheme in addition to the non-covalent thermoadhesive bonding scheme described in Example 1.

The pGMA monomer was determined to have a $T_g$ of ~60° C., which allows bonding at temperatures down to ~70° C. pGMA was used to bond full 300 mm wafers at 90° C., 7000N, for 15 min. This low temperature scheme is capable of a producing virtually void-free bond as shown in FIG. 7.

pGMA bonded wafers were then run through both coarse and fine CMP grind processes without any problems (polishing down to 60 μM thickness). These wafers can be mechanically debonded at room temperature, which demonstrates that the SAB methods disclosed herein can be used, for example, in temporary bonding to carrier wafers.

Also investigated was the ability to stabilize the pGMA film through a thermal anneal, which crosslinks the epoxy groups in the film and also improve surface adhesion. A slow (30 min) thermal anneal above 120° C. induced the crosslinking reaction, where the critical release energies increased drastically from ~30 J/m² to ~115 J/m².

FIG. 8 shows the critical release energies between PnPMA and pGMA pre/post anneal. This demonstrates that by thermal annealing, the temporary bond material can be converted into a permanent bond with very strong mechanical properties, which demonstrates the utility of using iCVD polymers and the SAB methods disclosed herein for permanent underfill and/or in combination with organic/copper hybrid bonding.

In addition to demonstrating SAB for full wafer temporary/permanent bonding with planar wafers, the use of SAB was demonstrated for die-wafer bonding in 3D integration applications.

iCVD pGMA was used as a temporary bond material for alignment and placement of patterned test dies onto a 300 mm wafer substrate with matching test structures. The temporary bonding was performed as above (90° C., 7000N, for 15 min), where after die placement the wafer was transferred into a full wafer bonding tool and heated to 350° C. in an inert atmosphere. During a short anneal, the iCVD polymer degraded and burned away cleanly, leaving exposed copper areas which was then bonded through copper-copper metallic bonding.

FIG. 9 shows a cross-section of the bond interface where grain boundary diffusion of copper over the interface is clearly visible. This demonstrates that the SAB methods disclosed herein can be used in a hybrid temporary bonding scheme, where low-temperature pick-and-placement of die is followed by metallic bonding. SAB methods can also be used for multilayer die chip stacks.

The present invention is not to be limited in scope by the specific embodiments described herein. Indeed, various modifications of the invention in addition to those described herein will become apparent to those skilled in the art from the foregoing description. Such modifications are intended to fall within the scope of the appended claims.

While embodiments of the present disclosure have been particularly shown and described with reference to certain examples and features, it will be understood by one skilled in the art that various changes in detail may be effected therein without departing from the spirit and scope of the present disclosure as defined by claims that can be supported by the written description and drawings. Further, where exemplary embodiments are described with reference to a certain number of elements it will be understood that the exemplary embodiments can be practiced utilizing either less than or more than the certain number of elements.

All references cited herein are incorporated herein by reference in their entirety and for all purposes to the same extent as if each individual publication, patent or patent application was specifically and individually indicated to be incorporated by reference in its entirety for all purposes.

The citation of any publication is for its disclosure prior to the filing date and should not be construed as an admission that the present invention is not entitled to antedate such publication by virtue of prior invention.

What is claimed is:

1. A method for solvent-free bonding of a first substrate and a second substrate, the method comprising the steps of:
    depositing a first polymeric film on a first surface of the first substrate, wherein the step of depositing the first polymeric film comprises using initiated chemical vapor deposition, and wherein the step of depositing the first polymeric film is conducted in a deposition chamber; and
    bonding the first substrate to the second substrate, wherein the bonding step comprises the step of contacting the first surface of the first substrate with a first surface of the second substrate.

2. The method of claim 1, additionally comprising the step of depositing a second polymeric film on the first surface of the second substrate, wherein the step of depositing the second polymeric film comprises using initiated chemical vapor deposition.

3. The method of claim 2, comprising the step of aging the second substrate comprising the deposited second polymeric film at a temperature above the glass transition temperature of the deposited second polymeric film until an amount of included monomers and/or short-chain polymers in the second polymeric film is released.

4. The method of claim 1, comprising the step of aging the first substrate comprising the deposited first polymeric film at a temperature above the glass transition temperature of the deposited first polymeric film until an amount of included monomers and/or short-chain polymers in the first polymeric film is released.

5. The method of claim 3, wherein the second substrate is aged at a temperature above the glass transition temperature of the deposited second polymeric film for at least 5 minutes.

6. The method of claim 2, wherein the first and/or second polymeric films are deposited at a substrate temperature of at least 0° C. and no more than 100° C.

7. The method of claim 2, wherein monomer and initiator for preparing the second polymeric film are introduced to the deposition chamber at a monomer flow rate and an initiator flow rate that provides a monomer/initiator molar ratio of at least 1 and no more than 30.

8. The method of claim 2, wherein the deposited second polymeric film is at least 5 nm and no more than 15 μm thick.

9. The method of claim 3, wherein the temperature above the glass transition temperature of the deposited second polymeric film is at least 10° C. over the glass transition temperature of the deposited second polymeric film.

10. The method of claim 2, wherein the deposited second polymeric film is selected from the group consisting of polyacrylates, polydiacrylates, polymethacrylates, polystyrenes, and polyvinyls.

11. The method of claim 4, wherein the first substrate is aged at a temperature above the glass transition temperature of the deposited first polymeric film for at least 5 minutes.

12. The method of claim 4, wherein the temperature above the glass transition temperature of the deposited first polymeric film is at least 10° C. over the glass transition temperature of the deposited first polymeric film.

13. The method of claim 1, wherein the first polymeric film is deposited at a substrate temperature of at least 0° C. and no more than 100° C.

14. The method of claim 1 wherein:
   (a) the temperature in the deposition chamber is at least 5° C. higher than substrate temperature, and/or
   (b) the deposition chamber pressure is at least 1 mTorr and no more than 1000 mTorr.

15. The method of claim 1, wherein monomer and initiator for preparing the first polymeric film are introduced to the deposition chamber at a monomer flow rate and an initiator flow rate that provides a monomer/initiator molar ratio of at least 1 and no more than 30.

16. The method of claim 1, wherein the deposited first polymeric film is at least 5 nm and no more than 15 μm thick.

17. The method of claim 1, wherein the composition of the first substrate, the second substrate, or both the first substrate and the second substrate is selected from the group consisting of silicon-based materials, polyethylene terephthalate (PET), polyethylene naphthalate (PEN), polycarbonate (PC), polyethersulphone (PES), polycyclic olefin (PCO), polyimide (KAPTON ®), polyethyleneimine (PEI), graphene, carbon nanotubes, and metal foils.

18. The method of claim 1, wherein the deposited first polymeric film is selected from the group consisting of polyacrylates, polydiacrylates, polymethacrylates, polystyrenes, and polyvinyls.

* * * * *